United States Patent
Arai et al.

(10) Patent No.: US 10,501,066 B2
(45) Date of Patent: Dec. 10, 2019

(54) CONTROL DEVICE FOR POWER TRANSMISSION DEVICE AND CONTROL METHOD FOR VEHICLE

(71) Applicant: TOYOTA JIDOSHA KABUSHIKI KAISHA, Toyota-shi, Aichi-ken (JP)

(72) Inventors: Masayuki Arai, Toyota (JP); Koji Takaira, Okazaki (JP); Akinori Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 15/701,566

(22) Filed: Sep. 12, 2017

(65) Prior Publication Data
US 2018/0086328 A1    Mar. 29, 2018

(30) Foreign Application Priority Data
Sep. 26, 2016    (JP) ................... 2016-187548

(51) Int. Cl.
*B60W 30/19*    (2012.01)
*B60W 10/10*    (2012.01)
(Continued)

(52) U.S. Cl.
CPC ............ *B60W 10/10* (2013.01); *B60W 10/02* (2013.01); *B60W 10/08* (2013.01);
(Continued)

(58) Field of Classification Search
CPC .......... F16H 2306/21; F16H 2061/085; F16H 61/0059; F16H 61/0403; F16H 2061/0474;
(Continued)

(56) References Cited

U.S. PATENT DOCUMENTS 7,713,169 B2 *  5/2010  Earp ................... F16H 61/702
                                                            477/127
8,869,642 B2 * 10/2014  Maurer ............... F16H 61/0403
                                                             74/335

FOREIGN PATENT DOCUMENTS

JP    H02-043554 U    3/1990
JP    2010-209949 A   9/2010
(Continued)

OTHER PUBLICATIONS

Partial translation of Jul. 24, 2018 Japanese Office Action issued in Japanese Patent Application No. 2016-187548.

*Primary Examiner* — Sherry L Estremsky
(74) *Attorney, Agent, or Firm* — Oliff PLC

(57) ABSTRACT

A control device for a power transmission device including an automatic transmission and a sub transmission is provided. The control device includes an electronic control unit. The electronic control unit is configured to perform a rotation speed decrease control in which at least one frictional engagement device is controlled to be an engaged state or a semi-engaged state at a time when switching of gear stage of the sub transmission is started or a time when the switching is started. The electronic control unit is configured to end the rotation speed decrease control during switching of the gear stage. The electronic control unit is configured to switch the sub transmission from the power transmission cutoff state to a state in which one of the high-speed engagement element and the low-speed engagement element is engaged, during disengagement of the at least one frictional engagement device.

6 Claims, 11 Drawing Sheets

(51) Int. Cl.
*B60W 10/02* (2006.01)
*B60W 10/08* (2006.01)
*B60W 10/119* (2012.01)
*B60W 20/30* (2016.01)

(52) U.S. Cl.
CPC .......... *B60W 10/119* (2013.01); *B60W 20/30* (2013.01); *B60W 30/19* (2013.01)

(58) Field of Classification Search
CPC ..... F16H 63/44; B60W 30/19; B60W 10/119; B60W 10/11
See application file for complete search history.

(56) References Cited

FOREIGN PATENT DOCUMENTS

| | | |
|---|---|---|
| JP | 2010-247603 A | 11/2010 |
| JP | 2016-211661 A | 12/2016 |

* cited by examiner

|  | C1 | C2 | C3 | B1 | B2 | B3 | B4 | F1 | F2 | F3 |
|---|---|---|---|---|---|---|---|---|---|---|
| 1st | O |  |  |  |  |  |  |  |  | O |
| 2nd | O |  |  |  |  | O |  | O | O |  |
| 3rd | O |  | O |  |  | △ |  | O |  |  |
| 4th | O | O | △ |  |  | △ |  |  |  |  |
| 5th |  | O | O | O |  | △ |  |  |  |  |
| Rev |  |  | O | (O) |  |  | O | O |  |  |

O: ENGAGED  (O): ENGINE BRAKE
△: ENGAGED BUT POWER IS NOT TRANSMITTED   BLANK: DISENGAGED

CONTROL DEVICE FOR POWER TRANSMISSION DEVICE AND CONTROL METHOD FOR VEHICLE

INCORPORATION BY REFERENCE

The disclosure of Japanese Patent Application No. 2016-187548 filed on Sep. 26, 2016 including the specification, drawings and abstract is incorporated herein by reference in its entirety.

BACKGROUND

1. Technical Field

The disclosure relates to a control device for a power transmission device including an automatic transmission and a sub transmission and a control method for a vehicle.

2. Description of Related Art

A power transmission device for a vehicle is disclosed in Japanese Patent Application Publication No. 2010-247603 (JP 2010-247603 A) and Japanese Patent Application Publication No. 2010-209949 (JP 2010-209949 A). The power transmission device includes an automatic transmission and a sub transmission. A configuration in which a transfer including a sub transmission is disposed downstream from a main transmission (an automatic transmission) is described in JP 2010-247603 A. In JP 2010-247603 A, when the sub transmission is switched from a neutral state to a power transmission state after both the main transmission and the sub transmission are in the neutral state, at least one frictional engagement element of the main transmission is engaged or semi-engaged to decrease a rotation speed of an output shaft of the main transmission. Accordingly, a rotation speed difference between rotary elements of the sub transmission is decreased to reduce gear noise and shock. In JP 2010-209949 A, when a sub transmission is switched from a neutral state to a power transmission state after both an automatic transmission and the sub transmission are in the neutral state, an oil temperature of hydraulic oil is equal to or lower than a determination value, and a rotation speed of an output shaft of the automatic transmission is high, an amount of lubricant in the automatic transmission is increased and the drag resistance of frictional engagement elements is increased. Accordingly, a rotation speed difference between rotary elements of the sub transmission is decreased.

SUMMARY

In the above-mentioned techniques, switching of the sub transmission is performed via the neutral state. Accordingly, the rotation speed of the output shaft of the automatic transmission is likely to increase. On the other hand, the switching is performed in a state in which the rotation speed of the output shaft of the automatic transmission is decreased by performing the above-mentioned control. As a result, gear noise or shock which is generated during the switching is reduced. However, by engaging or semi-engaging the frictional engagement elements, an engine torque is transmitted to the output shaft of the automatic transmission, a force (a shift load) required for switching the sub transmission from the neutral state to the power transmission state is increased, and thus switching of a gear stage of the sub transmission may be incomplete.

The disclosure provides a control device and a control method for a vehicle that can decrease a rotation speed of an output shaft of an automatic transmission and reduce a force required for switching a gear stage of a sub transmission at the time of switching the sub transmission in a power transmission device including an automatic transmission and a sub transmission.

A first aspect of the disclosure provides a control device for a power transmission device. The power transmission device is mounted on a vehicle. The power transmission device includes an automatic transmission and a sub transmission. The automatic transmission includes a plurality of frictional engagement devices. The sub transmission is disposed in a power transmission path between the automatic transmission and driving wheels of the vehicle. The sub transmission is configured to change a rotation speed of an output shaft of the automatic transmission. The sub transmission includes a high-speed engagement element and a low-speed engagement element. A gear stage of the sub transmission includes a high-speed gear stage and a low-speed gear stage. The high-speed engagement element is configured to be engaged when the high-speed gear stage is established. The low-speed engagement element is configured to be engaged when the low-speed gear stage is established. The control device includes an electronic control unit. The electronic control unit is configured to switch the gear stage of the sub transmission. When the electronic control unit switches the gear stage of the sub transmission, the electronic control unit is configured to control one of the high-speed engagement element and the low-speed engagement element under engagement to be disengaged and configured to control other one of the high-speed engagement element and the low-speed engagement element to be engaged via a power transmission cutoff state. The electronic control unit is configured to perform a rotation speed decrease control of decreasing the rotation speed of the output shaft of the automatic transmission. The electronic control unit is configured to perform the rotation speed decrease control in which at least one frictional engagement device of the plurality of frictional engagement devices is controlled to be one of an engaged state and a semi-engaged state at one of a time point before switching of the gear stage of the sub transmission is started and a time point at which the switching is started. The electronic control unit is configured to end the rotation speed decrease control during switching of the gear stage of the sub transmission. The electronic control unit is configured to switch the sub transmission from the power transmission cutoff state to a state in which one of the high-speed engagement element and the low-speed engagement element that are engaged after the gear stage of the sub transmission is switched is engaged during disengagement of the at least one frictional engagement device.

With this configuration, the rotation speed of the output shaft of the automatic transmission is decreased by performing the rotation speed decrease control at the time of switching the gear stage of the sub transmission. Accordingly, it is possible to decrease a rotation speed difference between the rotary elements of the sub transmission and to suppress gear noise or shock which is generated during the switching. Since the frictional engagement devices are disengaged by ending the rotation speed decrease control during switching of the sub transmission, it is possible to decrease a torque transmitted to the output shaft of the automatic transmission. By engaging the low-speed engagement element or the high-speed engagement element which is engaged after the sub transmission is switched in this state, it is possible to decrease a shift load required for the switching and to improve switchability.

In the control device for a power transmission device, the automatic transmission may include a temperature detector that detects an oil temperature of a hydraulic oil in the automatic transmission. The electronic control unit may be configured to set a period from a time point at which a command for switching the gear stage of the sub transmission is output to a time point at which the rotation speed decrease control is ended to be longer as the oil temperature of the hydraulic oil detected by the temperature detector becomes higher.

With this configuration, as the oil temperature of the hydraulic oil becomes higher, the rotation speed of the output shaft of the automatic transmission increases faster from a time point at which the rotation speed decrease control is ended. Accordingly, by increasing a period from a time point at which a command for switching the gear stage of the sub transmission is output to a time point at which the rotation speed decrease control is ended, it is possible to reduce a rotation speed difference which is generated between the rotary elements of the sub transmission when the low-speed engagement element or the high-speed engagement element is engaged regardless of the oil temperature.

In the control device for a power transmission device, the electronic control unit may be configured to end the rotation speed decrease control when the electronic control unit determines that malfunction has occurred in the temperature detector.

With this configuration, when malfunction has occurred in the temperature detector, the rotation speed decrease control is ended. Accordingly, it is possible to decrease a torque which is transmitted to the output shaft of the automatic transmission and to switch the gear stage even in a state in which the oil temperature is low.

In the control device for a power transmission device, the electronic control unit may be configured to engage the frictional engagement devices such that the rotation speed of the output shaft of the automatic transmission decreases. Accordingly, it is possible to decrease the rotation speed of the output shaft by causing the rotation speed decrease control unit to engage or semi-engage the frictional engagement devices.

In the control device for a power transmission device, the electronic control unit may be configured to end the rotation speed decrease control at the same time as outputting the command for switching the gear stage of the sub transmission in a range in which the oil temperature of the hydraulic oil is equal to or lower than a preset low temperature threshold value. When the oil temperature of the hydraulic oil is in a low temperature range lower than a low temperature threshold value, responsiveness of an oil pressure is poor. Accordingly, a drag torque is not likely to decrease and the rotation speed of the output shaft of the automatic transmission increases slowly. Therefore, when the oil temperature is equal to or lower than the low temperature threshold value, it is possible to decrease a rotation speed difference between the rotary elements of the sub transmission and to reduce a drag torque at the time of switching the gear stage, by ending the rotation speed decrease control at the same time as outputting the command for switching the gear stage.

A second aspect of the disclosure provides a control method for a vehicle. The vehicle includes a power transmission device and an electronic control unit. The power transmission device includes an automatic transmission and a sub transmission. The automatic transmission includes a plurality of frictional engagement devices. The sub transmission is disposed in a power transmission path between the automatic transmission and driving wheels of the vehicle. The sub transmission is configured to change a rotation speed of an output shaft of the automatic transmission. The sub transmission includes a high-speed engagement element and a low-speed engagement element. A gear stage of the sub transmission includes a high-speed gear stage and a low-speed gear stage. The high-speed engagement element is configured to be engaged when the high-speed gear stage is established. The low-speed engagement element is configured to be engaged when the low-speed gear stage is established. The control method includes: switching, by the electronic control unit, the gear stage of the sub transmission; when the electronic control unit switches the gear stage of the sub transmission, controlling, by the electronic control unit, one of the high-speed engagement element and the low-speed engagement element under engagement to be disengaged, and controlling, by the electronic control unit, the other one of the high-speed engagement element and the low-speed engagement element to be engaged via a power transmission cutoff state; performing, by the electronic control unit, a rotation speed decrease control of decreasing the rotation speed of the output shaft of the automatic transmission; performing, by the electronic control unit, the rotation speed decrease control in which at least one frictional engagement device of the plurality of frictional engagement devices is controlled to be one of an engaged state and a semi-engaged state at one of a time point before switching of the gear stage of the sub transmission is started and a time point at which the switching is started; ending, by the electronic control unit, the rotation speed decrease control during switching of the gear stage of the sub transmission; and switching, by the electronic control unit, the sub transmission from the power transmission cutoff state to a state in which one of the high-speed engagement element and the low-speed engagement element that are engaged after the gear stage of the sub transmission is switched is engaged, during disengagement of the at least one frictional engagement device.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the disclosure will be described in detail with reference to the accompanying drawings. In the following embodiments, the drawings are appropriately simplified or modified and dimensional ratios, shapes, and the like of elements do not match actual ones.

Figure 1:
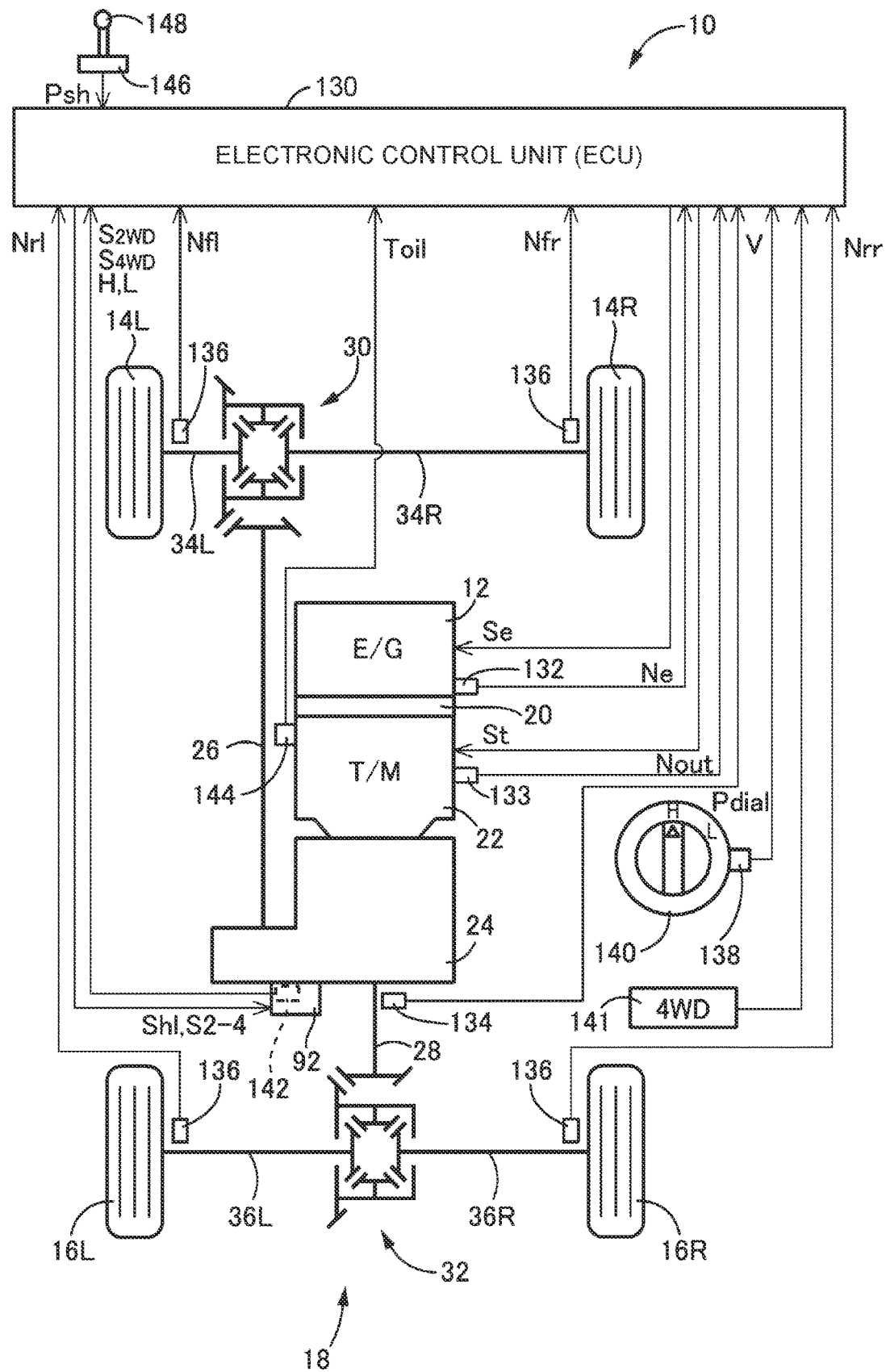
FIG. 1 is a block diagram illustrating a configuration of a vehicle to which the disclosure is suitably applied, where principal parts of a control system disposed in the vehicle are illustrated.

FIG. 1 is a block diagram illustrating a configuration of a vehicle 10 according to an embodiment of the disclosure, where principal parts of a control system disposed in the vehicle 10 are illustrated. In FIG. 1, the vehicle 10 is, for example, a four-wheel-drive vehicle based on a front-engine rear-driving (FR) system and includes a power transmission device 18 (hereinafter referred to as a power transmission device 18) that transmits power from an engine 12 as a driving force source for traveling to a pair of right and left front wheels 14L, 14R (which are referred to as front wheels 14 when the two are not particularly distinguished) as sub driving wheels and a pair of right and left rear wheels 16L, 16R (which are referred to as rear wheels 16 when the two are not particularly distinguished) as main driving wheels.

The power transmission device 18 includes: a torque converter 20 that is connected to the engine 12; an automatic transmission 22; a transfer (a power split device) 24 that is connected to an output side of the automatic transmission 22 and splits power transmitted from the automatic transmission 22 to the front wheels 14 and the rear wheels 16; a front propeller shaft 26 that transmits power split by the transfer 24 to the front wheels 14; a rear propeller shaft 28 that transmits power split by the transfer 24 to the rear wheels 16; a front-wheel differential gear mechanism 30 that is connected to the front propeller shaft 26; a rear-wheel differential gear mechanism 32 that is connected to the rear propeller shaft 28; a pair of right and left front axles 34L, 34R (which are referred to as front axles 34 when the two are not particularly distinguished) that transmit power transmitted via the front-wheel differential gear mechanism 30 to the front wheels 14; and a pair of right and left rear axles 36L, 36R (which are referred to as rear axles 36 when the two are not particularly distinguished) that transmit power transmitted via the rear-wheel differential gear mechanism 32 to the rear wheels 16.

In the power transmission device 18, during two-wheel driving, power generated by the engine 12 is transmitted to the pair of right left rear wheels 16 sequentially via the torque converter 20, the automatic transmission 22, the transfer 24, the rear propeller shaft 28, the rear-wheel differential gear mechanism 32, and the pair of right and left rear axles 36. During four-wheel driving, in addition to transmission of power to the front wheels 14 during two-wheel driving, power generated by the engine 12 is transmitted to the pair of right and left front wheels 14 sequentially via the torque converter 20, the automatic transmission 22, the transfer 24, the front propeller shaft 26, the front-wheel differential gear mechanism 30, and the pair of right and left front axles 34.

The engine 12 is, for example, an internal combustion engine such as a gasoline engine or a diesel engine that generates a driving force by combustion of fuel which is injected into cylinders. The torque converter 20 is a known hydraulic power transmission device that transmits power via fluid between a pump impeller and a turbine runner which are not illustrated.

The automatic transmission 22 includes a plurality of planetary gear mechanisms and a plurality of frictional engagement elements (clutches and brakes). The automatic transmission 22 has a function of establishing a plurality of gear stages depending on combinations of engagement or disengagement of the frictional engagement elements. Thus, the automatic transmission 22 is configured to shift a rotation speed of an input shaft, and output the shifted rotation speed to an output shaft.

Figures 2, 3:
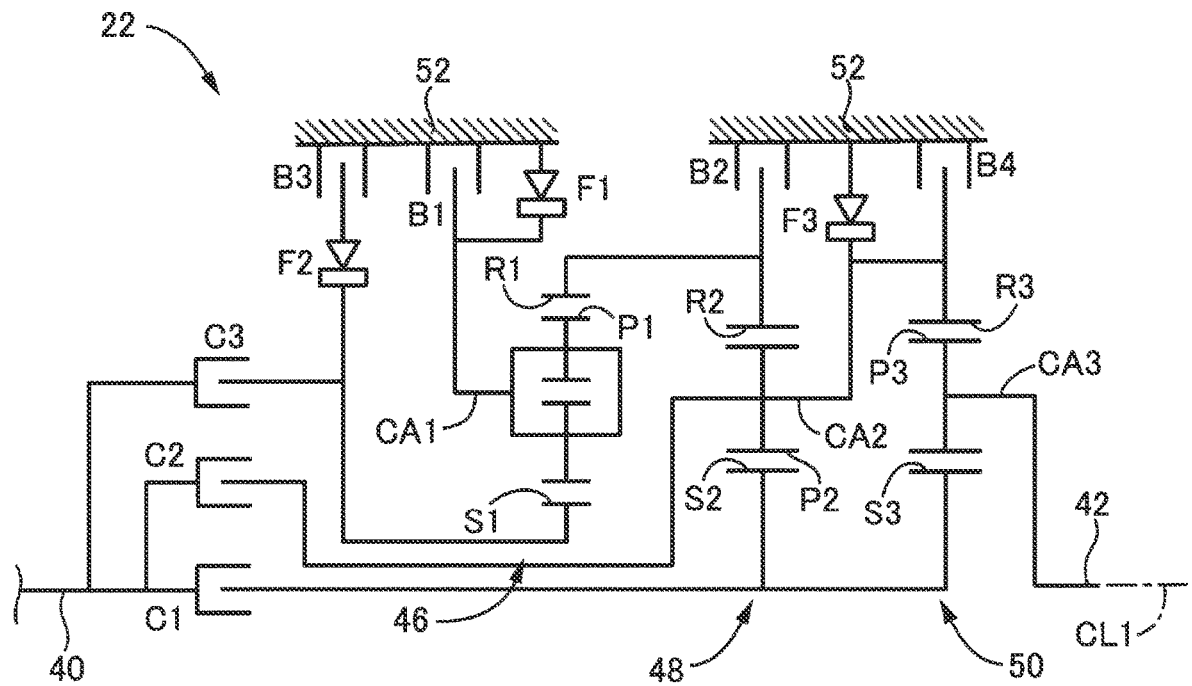
FIG. 2 is a skeleton diagram of an automatic transmission illustrated in FIG. 1.
FIG. 3 is an engagement operation table illustrating operation states of frictional engagement devices when gear stages are established in the automatic transmission illustrated in FIG. 2.

FIG. 2 is a skeleton diagram of the automatic transmission 22. The automatic transmission 22 is substantially symmetric about a rotation axis CL1 and a lower half thereof is not illustrated therein. The automatic transmission 22 includes an input shaft 40 and an output shaft 42 that are disposed to be rotatable about the axis CL1, a first planetary gear mechanism 46, a second planetary gear mechanism 48, a third planetary gear mechanism 50, first to third clutches C1 to C3 (which are referred to as clutches when they are not particularly distinguished), first to fourth brakes B1 to B4 (which are referred to as brakes B when they are not particularly distinguished), and first to third one-way clutches F1 to F3 (which are referred to as one-way clutches F when they are not particularly distinguished). The first to third clutches C1 to C3 and the first to fourth brakes B1 to B4 correspond to the frictional engagement devices in the claims.

The input shaft 40 is connected to the turbine runner of the torque converter 20. The output shaft 42 is connected to an input shaft 74 of the transfer 24 which will be described later.

The first planetary gear mechanism 46 is constituted as a double pinion type planetary gear mechanism and includes a first sun gear S1, a plurality of pairs of first pinion gears P1 that engage with each other, a first carrier CA1 that supports the first pinion gear P1 such that they can rotate and revolve, and a first ring gear R1 that engages with the first sun gear S1 via a first pinion gear P1.

The second planetary gear mechanism 48 is constituted as a single pinion type planetary gear mechanism and includes a second sun gear S2, a second pinion gear P2, a second carrier CA2 that supports the second pinion gear P2 such that it can rotate and revolve, and a second ring gear R2 that engages with the second sun gear S2 via the second pinion gear P2.

The third planetary gear mechanism 50 is constituted as a single pinion type planetary gear mechanism and includes a third sun gear S3, a third pinion gear P3, a third carrier CA3 that supports the third pinion gear P3 such that it can rotate and revolve, and a third ring gear R3 that engages with the third sun gear S3 via the third pinion gear P3.

The first sun gear S1 of the first planetary gear mechanism 46 is connected to the input shaft 40 via the third clutch C3 and is connected to a case 52 which is a non-rotary member via the second one-way clutch F2 and the third brake B3. The first carrier CA1 is connected to the case 52 via the first brake B1 and the one-way clutch F1 which are disposed parallel to each other. The first ring gear R1 is connected to the second ring gear R2 of the second planetary gear mechanism 48 and is connected to the case 52 via the second brake B2.

The second sun gear S2 of the second planetary gear mechanism 48 is connected to the third sun gear S3 of the third planetary gear mechanism 50. The second sun gear S2 is connected to the input shaft 40 via the first clutch C1. The second carrier CA2 is connected to the third ring gear R3 of the third planetary gear mechanism 50. The second carrier CA2 is connected to the input shaft 40 via the second clutch C2. The second carrier CA2 is connected to the case 52 via the third one-way clutch F3 and the fourth brake B4 which are disposed parallel to each other. The second ring gear R2 is connected to the first ring gear R1. The second ring gear R2 is connected to the case 52 via the second brake B2.

The third sun gear S3 of the third planetary gear mechanism 50 is connected to the second sun gear S2. The third sun gear S3 is connected to the input shaft 40 via the first clutch C1. The third carrier CA3 is connected to the output shaft 42 constantly. The third ring gear R3 is connected to the second carrier CA2. The third ring gear R3 is connected to the input shaft 40 via the second clutch C2. The third ring gear R3 is connected to the case 52 via the third one-way clutch F3 and the fourth brake B4 which are disposed parallel to each other.

The automatic transmission 22 includes the three clutches C (C1 to C3), the four brakes B (B1 to B4), and the three one-way clutches F (F1 to F3), and a first gear stage "1st" to a fifth gear stage "5th" and a reverse gear stage "Rev" are setup by appropriately engaging and disengaging the clutches C1 to C3, the brakes B1 to B4, and the one-way clutches F1 to F3. The clutches C and the brakes B are hydraulic frictional engagement devices of which engagement is controlled by a hydraulic actuator such as a multi-disk clutch or brake, and are switched between an engaged state and a disengaged state, and transient hydraulic pressures and the like at the time of engagement and disengagement are controlled. For the one-way clutches F, a known roller type or a known sprag type may be employed.

FIG. 3 is an engagement operation table illustrating operation states of the frictional engagement devices when the gear stages are established, where "O" denotes an "engaged state" and a blank denotes a "disengaged state." In FIG. 3, "Δ" denotes an engaged state in which power is not transmitted. As illustrated in FIG. 2, the first clutch C1 and the third one-way clutch F3 engage with each other to establish the first gear stage "1st." The first clutch C1, the third brake B3, the first one-way clutch F1, and the second one-way clutch F2 engage with each other to set up the second gear stage "2nd." The first clutch C1, the third clutch C3, the third brake B3, and the first one-way clutch F1 engage with each other to establish the third gear stage "3rd." The first clutch C1, the second clutch C2, the third clutch C3, and the third brake B3 engage with each other to establish the fourth gear stage "4th." The second clutch C2, the third clutch C3, the first brake B1, and the third brake B3 engage with each other to establish the fifth gear stage "5th." The third clutch C3, the first brake B1 (at the time of engine brake), the fourth brake B4, and the first one-way clutch F1 engage with each other to establish the reverse gear stage "Rev." All the clutches C and all the brakes B are disengaged to establish neutral "N" in which transmission of power is cut off. The gear shift ratio γ of each gear stage (=a rotation speed Nin of the input shaft 40 a rotation speed Nout of the output shaft 42) is appropriately determined depending on the gear shift ratios (=the number of teeth of a sun gear/the number of teeth of a ring gear) ρ1, ρ2, and ρ3 of the first planetary gear mechanism 46, the second planetary gear mechanism 48, and the third planetary gear mechanism 50.

The transfer 24 is a device that splits power transmitted from the automatic transmission 22 to the front wheels 14 and the rear wheels 16. The transfer 24 further includes a sub transmission 54 that changes a rotation speed of the output shaft 42 of the automatic transmission 22 and transmits the changed rotation speed to the output side, for example, by establishing any one of a high-speed gear stage (a high-speed shift stage) H and a low-speed gear stage (a low-speed shift stage) L. The sub transmission 54 is disposed in a power transmission path between the automatic transmission 22 and the rear wheels 16 (the main drive wheels).

Figure 4:
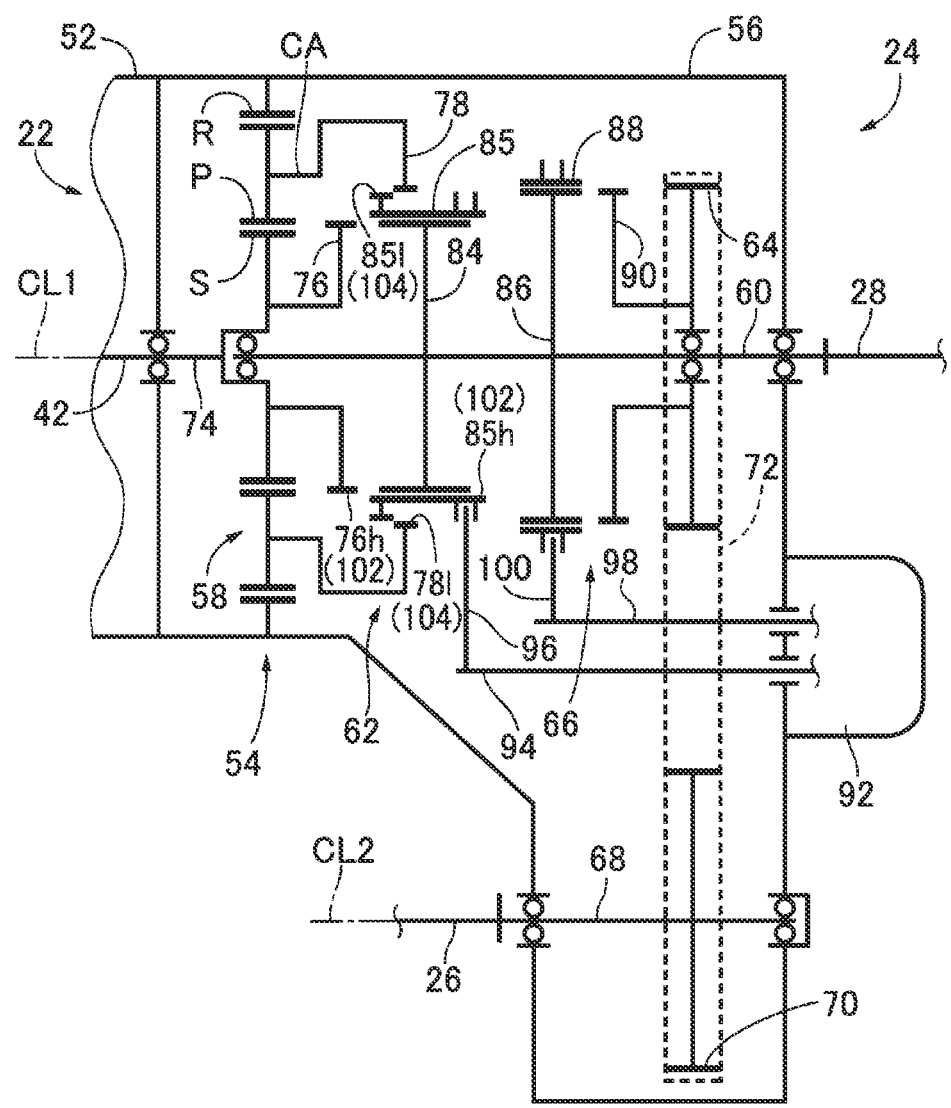
FIG. 4 is a skeleton diagram of a transfer.

FIG. 4 is a skeleton diagram of the transfer 24. In FIG. 4, the transfer 24 includes a transfer case 56 which is a non-rotary member connected to the case 52 of the automatic transmission 22. The transfer 24 includes the sub transmission 54 including a single pinion type planetary gear mechanism 58 and a first meshing clutch device 62 as main components, a first output shaft 60 that is a main drive shaft supported by the transfer case 56 to be rotatable about the axis CL1 and connected to the rear propeller shaft 28, a drive gear 64 that is disposed to be relatively rotatable about the first output shaft 60 (the rear propeller shaft 28), and a second meshing clutch device 66 that connects and disconnects the drive gear 64 and the first output shaft 60, on the common axis CL1 in the transfer case 56. The first meshing clutch device 62 has a function of alternatively establishing a low-speed gear stage L and a high-speed gear stage H by setting one of two power transmission paths extending from the sub transmission 54 to the first output shaft 60 to a connected state.

The transfer 24 includes a second output shaft that is supported to be rotatable about an axis CL2 in the transfer case 56 and is connected to the front propeller shaft 26 and a driven gear 70 that is disposed to be non-rotatable relative to the second output shaft 68, on the common axis CL2 in the transfer case 56. The transfer 24 further includes a chain 72 that mechanically connects the drive gear 64 and the driven gear 70.

The transfer 24 transmits rotation of the input shaft 74 that is supported to be rotatable about the axis CL1 to the first output shaft 60 via the sub transmission 54, and does not transmit power from the first output shaft 60 to the second output shaft 68 (that is, the power transmission path from the first output shaft 60 to the second output shaft 68 is cut off) in a state in which the first output shaft 60 and the drive gear 64 are disconnected (that is, a state in which the rotation of the drive gear 64 relative to the first output shaft 60 is permitted). On the other hand, in a state in which the first output shaft 60 and the drive gear 64 are connected (that is, a state in which the first output shaft 60 and the drive gear 64 rotate integrally), power is transmitted from the first output shaft 60 to the second output shaft 68 via the drive gear 64, the chain 72, and the driven gear 70 (that is, the power transmission path from the first output shaft 60 to the second output shaft 68 is established). The input shaft 74 is connected to the output shaft 42 of the automatic transmission 22 via a spline fitting joint or the like, and is rotationally driven by a driving force (a torque) input from the engine 12 via the automatic transmission 22.

The planetary gear mechanism 58 includes a sun gear S that is connected to the input shaft 74 to be rotatable about the axis CL1, a ring gear R that is disposed around the same axis CL1 as the sun gear S and is connected to the transfer case 56 which is a non-rotary member fixed to a vehicle body to be non-rotatable about the axis CL1, and a carrier CA that supports a plurality of pinion gears P meshing with the sun gear S and the ring gear R to rotate and to revolve about the axis CL1.

The rotation speed of the sun gear S is constant with respect to the input shaft 74 and the rotation speed of the carrier CA decreases with respect to the input shaft 74. In the sun gear S, a clutch gear 76 associated with establishing of the high-speed gear stage H in the first meshing clutch device 62 is fixed thereto to be non-rotatable relative to the sun gear S. In the carrier CA, a clutch gear 78 associated with establishing of the low-speed gear stage L in the first meshing clutch device 62 is fixed thereto to be non-rotatable relative to the carriers CA.

The first meshing clutch device 62 includes a meshing clutch. The first meshing clutch device 62 includes a clutch gear 76 in which outer circumferential teeth 76$h$ (meshing teeth) for establishing the high-speed gear stage H are formed, a clutch gear 78 in which inner circumferential teeth 78$l$ (meshing teeth) for establishing the low-speed gear stage L are formed, a clutch hub 84 that is fixed to be non-rotatable relative to the first output shaft 60, and a cylindrical sleeve 85 that is disposed to be non-rotatable relative to the clutch hub 84 and to be movable in the direction of the axis CL1 relative thereto by being fitted to the clutch hub 84. The sleeve 85 is formed in a cylindrical shape, and is configured to be non-rotatable relative to the clutch hub 84 and to be movable in the direction of the axis CL1 relative thereto by engaging inner circumferential teeth 85$h$ formed on an inner circumferential portion thereof with outer circumferential teeth formed on the clutch hub 84. The inner circumferential teeth 85$h$ formed on the inner circumferential portion of the sleeve 85 are formed to mesh with the outer circumferential teeth 76$h$ of the clutch gear 76. A high-speed engagement element 102 which is engaged at the time of establishing the high-speed gear stage H is constituted by the inner circumferential teeth 85$h$ (meshing teeth) of the sleeve 85 and the outer circumferential teeth 76$h$ (meshing teeth) of the clutch gear 76, and a low-speed engagement element 104 which is engaged at the time of establishing the low-speed gear stage L is constituted by the outer circumferential teeth 85$l$ (meshing teeth) of the sleeve 85 and the inner circumferential teeth 78$l$ (meshing teeth) of the clutch gear 78. The high-speed engagement element 102 and the low-speed engagement element 104 are referred to as meshing engagement elements when the two are not particularly distinguished).

In the first meshing clutch device 62, the high-speed gear stage H is established in the sub transmission 54 by moving the sleeve 85 to the input shaft 74 side (to the left in FIG. 4) in the direction of the axis CL1 to cause the inner circumferential teeth 85$h$ (meshing teeth) of the sleeve 85 to mesh with the outer circumferential teeth 76$h$ (meshing teeth) of the clutch gear 76, that is, by engaging the high-speed engagement element 102. The low-speed gear stage L is established in the sub transmission 54 by moving the sleeve 85 to the rear propeller shaft 28 side (to the right in FIG. 4) in the direction of the axis CL1 to cause the outer circumferential teeth 85$l$ (meshing teeth) of the sleeve 85 to mesh with the inner circumferential teeth 78$l$ (meshing teeth) of the clutch gear 78, that is, by engaging the low-speed engagement element 104. A position in the direction of the axis CL1 of the sleeve 85 at which the inner circumferential teeth 85$h$ of the sleeve 85 mesh with the outer circumferential teeth 76$h$ of the clutch gear 76 to engage the high-speed engagement element 102 and the high-speed gear stage H established in the sub transmission 54 is defined as a switching completion position of the high-speed gear stage H. A position in the direction of the axis CL1 of the sleeve 85 at which the outer circumferential teeth 85$l$ of the sleeve 85 mesh with the inner circumferential teeth 78$l$ of the clutch gear 78 to engage the low-speed engagement element 104 and the low-speed gear stage L established in the sub transmission 54 is defined as a switching completion position of the low-speed gear stage L.

As illustrated in FIG. 4, the sub transmission 54 is brought into a power transmission cutoff state (neutral state) by causing the inner circumferential teeth 85$h$ of the sleeve 85 not to mesh with the outer circumferential teeth 76$h$ of the clutch gear 76 (to disengage the high-speed engagement element 102) and causing the outer circumferential teeth 85$l$ of the sleeve 85 not to mesh with the inner circumferential teeth 78$l$ of the clutch gear 78 (to disengage the low-speed engagement element 104). The sub transmission 54 passes through the power transmission cutoff state in a transient switching period when the gear stage is switched between the high-speed gear stage H and the low-speed gear stage L.

The second meshing clutch device 66 includes a meshing clutch. The second meshing clutch device 66 includes a clutch hub 86 that is fixed to be non-rotatable relative to the first output shaft 60, a cylindrical sleeve 88 that is disposed to be non-rotatable relative to the clutch hub 86 and to be movable in the direction of the axis CL1 relative thereto by being fitted to the clutch hub 86, and a clutch gear 90 that is fixed to the drive gear 64 and has outer circumferential teeth (meshing teeth), which can mesh with the inner circumferential teeth (meshing teeth) formed on the inner circumferential surface of the sleeve 88, formed therein. The sleeve 88 is disposed to be normally located at a neutral position at which transmission of power is cut off as illustrated in FIG. 4 and to be movable to a power transmission possible position at which transmission of power is possible by being moved in the direction of the axis CL1 by a shift actuator 92.

In the second meshing clutch device 66, when the shift actuator 92 for moving the sleeve 88 is not driven, the sleeve 88 is located at the position illustrated in FIG. 4 with respect to the clutch hub 86. In this state, since the drive gear 64 is rotatable about the axis CL1 relative to the first output shaft 60 and the drive gear 64 revolves around the first output shaft 60, transmission of power to the second output shaft 68 via the drive gear 64 is not performed (a two-wheel driving state).

On the other hand, when the inner circumferential teeth of the sleeve 88 mesh with the outer circumferential teeth of the clutch gear 90 due to moving the sleeve 88 to the clutch gear 90 side (the rear propeller shaft 28 side) in the direction of the axis CL1 with driving of the shift actuator 92, the rotation of the drive gear 64 about the axis CL1 relative to the first output shaft 60 is stopped and the drive gear 64 rotates integrally with the first output shaft 60. Accordingly, power is transmitted to the second output shaft 68 via the drive gear 64, the chain 72, and the driven gear 70 (a four-wheel driving state). That is, the driving state is switched between the two-wheel driving state and the four-wheel driving state. The two-wheel driving state is a driving state in which the vehicle travels by transmitting power from the engine 12 from the first output shaft 60 to only the rear wheels 16. The four-wheel driving state is a driving state in which the vehicle travels by transmitting power from the second output shaft 68 to the front wheels 14 in addition to transmission of power from the engine 12 to the rear wheels 16, by the second meshing clutch device 66.

The first meshing clutch device 62 moves the sleeve 85 in the direction of the axis CL1 via a first shift fork 96 connected to a first shift fork shaft 94 by moving the first shift fork shaft 94 disposed in parallel to the axis CL1 in a direction which is parallel to the axis CL1 with driving of the shift actuator 92. The second meshing clutch device 66 moves the sleeve 88 in the direction of the axis CL1 via a second shift fork 100 connected to a second shift fork shaft 98 by moving the second shift fork shaft 98 disposed in parallel to the axis CL1 in a direction which is parallel to the axis CL1 with driving of the shift actuator 92.

Referring to FIG. 1 again, the vehicle 10 includes an electronic control unit 130 that switches an operation state of the transfer 24. The electronic control unit 130 is configured to include, for example, a so-called microcomputer including a CPU, a RAM, a ROM, and an input/output interface. The electronic control unit 130 performs control of the output of the engine 12, control of the gear shift of the automatic transmission 22, and control of the switching of the gear stage of the sub transmission 54 by causing the CPU to processes signals in accordance with a program stored in advance in the ROM using a temporary storage function of the RAM.

The electronic control unit 130 is supplied with various signals. The various signals are, for example: a signal indicating an engine rotation speed Ne which is detected by an engine rotation speed sensor 132; a signal indicating an output shaft rotation speed Nout of the output shaft 42 of the automatic transmission 22 which is detected by an output shaft rotation speed sensor 133; a signal indicating a vehicle speed V corresponding to an output rotation speed Npr of the rear propeller shaft 28 which is detected by a rear propeller rotation speed sensor 134; signals of wheel speeds Nfr, Nfl, Nrr, Nrl corresponding to rotation speeds Nw of the wheels (that is, the front wheels 14R and 14L and the rear wheels 16R and 16L) which are detected by wheel speed sensors 136; a signal indicating an operation position Pdial of an H-L switch 140 which is detected by a dial position sensor 138; a signal indicating whether a switching operation of switching to one of the four-wheel driving and the two-wheel driving is performed, which is detected by a driving state switch 141; a signal indicating a power transmission state, for example, a two-wheel driving state S2WD and a four-wheel driving state S4WD, in the transfer 24 which is detected by a driving state detecting switch 142; a signal indicating the gear stage H or L of the sub transmission 54; a signal indicating an oil temperature Toil of hydraulic oil in the automatic transmission 22 which is detected by an oil temperature sensor 144; and a signal indicating a shift position Psh which is an operation position of a shift lever 148 which is detected by a shift position sensor 146.

The electronic control unit 130 outputs various control signals. The various control signals are, for example: an engine output control signal Se for controlling the output of the engine 12; a gear shift control signal St for controlling the gear shift of the automatic transmission 22; a high-low switching control signal Shl for switching the gear stage of the sub transmission 54 to the high-speed gear stage H or the low-speed gear stage L by activating the first meshing clutch device 62 via the first shift fork shaft 94 using the shift actuator 92; and a driving state switching control signal S2-4 for switching the driving state of the transfer 24 to the two-wheel driving state or the four-wheel driving state by activating the second shift fork shaft 98 via the second shift fork shaft 98 using the shift actuator 92.

The H-L switch 140 is, for example, a dial switch that is disposed in the vicinity of a driver and that is manually operated by the driver, and includes two operation positions Pdial for instructing switching of the sub transmission 54 to one of the high-speed gear stage H and the low-speed gear stage L. For example, the sub transmission 54 is switched to the high-speed gear stage H when the operation position Pdial of the H-L switch 140 is switched to a H position, and the sub transmission 54 is switched to the low-speed gear stage L when the operation position Pdial is switched to an L position. The H-L switch 140 is not limited to a dial type, and may be of a slide type, a push button type, a seesaw type, or the like.

The driving state switch 141 is, for example, a push button type switch, is switched to the four-wheel driving state when the switch is pushed in the two-wheel driving state, and is switched to the two-wheel driving state when the switch is pushed in the four-wheel driving state. The driving state switch 141 is not limited to a push button type, and may be of a slide type, a seesaw type, a dial type, or the like. The operation state of the transfer 24 based on the H-L switch 140 and the driving state switch 141 is displayed by an indicator lamp which is not illustrated.

Figure 5:
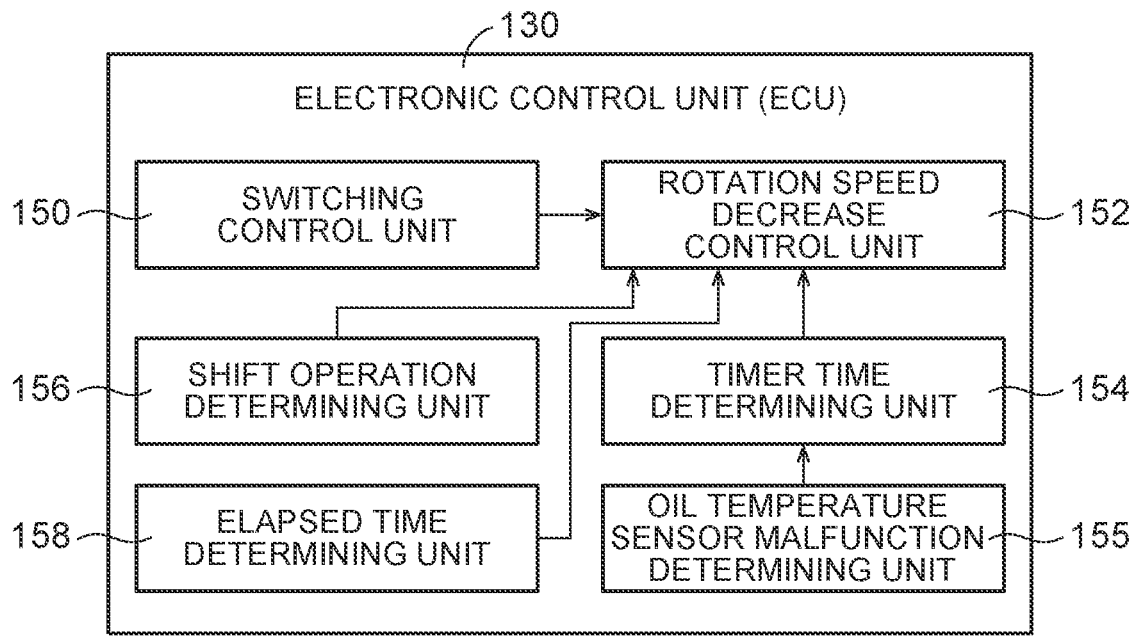
FIG. 5 is a functional block diagram particularly illustrating switching control of the transfer as a control function of an electronic control unit.

FIG. 5 is a functional block diagram illustrating a control function of the electronic control unit 130, particularly, control of switching of the transfer 24. The electronic control unit 130 functionally includes a switching control unit 150 (switching control means), a rotation speed decrease control unit 152 (rotation speed decrease control means), a timer time determining unit 154 (timer time determining means), an oil temperature sensor malfunction determining unit 155 (oil temperature sensor malfunction determining means), a shift operation determining unit 156 (shift operation determining means), and an elapsed time determining unit 158 (elapsed time determining means).

The switching control unit 150 performs switching of the gear stage of the sub transmission 54 based on the signal indicating the operation position Pdial of the H-L switch 140. For example, when the operation position Pdial is switched from the L position corresponding to the low-speed gear stage L to the H position corresponding to the high-speed gear stage H, the switching control unit 150 outputs the high-low switching control signal Shl for switching the gear stage of the sub transmission 54 to the high-speed gear stage H to the shift actuator 92 and switches the gear stage of the sub transmission 54 from the low-speed gear stage L to the high-speed gear stage H by activating the first meshing clutch device 62 via the first shift fork shaft 94 and the first shift fork 96.

Specifically, the switching control unit 150 moves the sleeve 85 to the input shaft 74 side (to the left side in FIG. 4) in the direction of the axis CL1 to release meshing (engagement) of the outer circumferential teeth 85*l* and the inner circumferential teeth 78*l* (to disengage the low-speed engagement element 104) from a state in which the low-speed gear stage L is established by causing the outer circumferential teeth 85*l* (meshing teeth) of the sleeve 85 and the inner circumferential teeth 78*l* (meshing teeth) of the clutch gear 78 to mesh with each other, that is, engaging the low-speed engagement element 104, and moves the sleeve 85 to the switching completion position at which the high-speed gear stage H is established by causing the inner circumferential teeth 85*h* (meshing teeth) of the sleeve 85 and the outer circumferential teeth 76*h* (meshing teeth) of the clutch gear 76 to mesh with each other, that is, engaging the high-speed engagement element 102. Accordingly, by switching to the state in which the inner circumferential teeth 85*h* and the outer circumferential teeth 76*h* mesh with each other, that is, the state in which the high-speed engagement element 102 is engaged, the gear stage of the sub transmission 54 is switched from the low-speed gear stage L to the high-speed gear stage H.

When the operation position Pdial is switched from the H position corresponding to the high-speed gear stage H to the L position corresponding to the low-speed gear stage L, the switching control unit 150 switches the gear stage of the sub transmission 54 from the high-speed gear stage H to the low-speed gear stage L by outputting the high-low switching control signal Shl for switching the gear stage of the sub transmission 54 to the low-speed gear stage L to the shift actuator 92 and operating the first meshing clutch device 62 via the first shift fork shaft 94 and the first shift fork 96.

Specifically, the switching control unit 150 moves the sleeve 85 to the rear propeller shaft 28 side (to the right side in FIG. 4) in the direction of the axis CL1 to release meshing (engagement) of the inner circumferential teeth 85*h* and the outer circumferential teeth 76*h* (to disengage the high-speed engagement element 102) from a state in which the high-speed gear stage H is established by causing the inner circumferential teeth 85*h* (meshing teeth) of the sleeve 85 and the outer circumferential teeth 76*h* (meshing teeth) of the clutch gear 78 to mesh with each other, that is, engaging the high-speed engagement element 102, and moves the sleeve 85 to the switching completion position at which the low-speed gear stage L is established by causing the outer circumferential teeth 85*l* of the sleeve 85 and the inner circumferential teeth 78*l* of the clutch gear 78 to mesh with each other, that is, engaging the low-speed engagement element 104. Accordingly, by switching to the state in which the outer circumferential teeth 85*l* and the inner circumferential teeth 78*l* mesh with each other, that is, the state in which the low-speed engagement element 104 is engaged, the gear stage of the sub transmission 54 is switched from the high-speed gear stage H to the low-speed gear stage L.

The switching control unit 150 outputs a driving state switching control signal S2-4 for switching the driving state of the transfer 24 to the shift actuator 92 based on the operation of switching the driving state using the driving state switch 141, and connects and disconnects the second meshing clutch device 66 via the second shift fork shaft 98 and the second shift fork 100.

For example, when the driving state switch 141 is pushed during two-wheel driving, the switching control unit 150 outputs the driving state switching control signal S2-4 for switching the driving state of the transfer 24 to the four-wheel driving state to the shift actuator 92 and connects the second meshing clutch device 66 via the second shift fork shaft 98 and the second shift fork 100. Specifically, the switching control unit 150 connects the second meshing clutch device 66 by moving the sleeve 88 to the rear propeller shaft 28 side (to the right in FIG. 4) in the direction of the axis CL1 and causing the inner circumferential teeth (meshing teeth) of the sleeve 88 and the outer circumferential teeth (meshing teeth) of the clutch gear 90 to mesh with each other. Accordingly, the driving state is switched from the two-wheel driving state to the four-wheel driving state.

For example, when the driving state switch 141 is pushed during four-wheel driving, the switching control unit 150 outputs the driving state switching control signal S2-4 for switching the driving state of the transfer 24 to the two-wheel driving state to the shift actuator 92 and disconnects the second meshing clutch device 66 via the second shift fork shaft 98 and the second shift fork 100. Specifically, the switching control unit 150 disconnects the second meshing clutch device 66 by moving the sleeve 88 to the automatic transmission 22 side (to the left in FIG. 4) in the direction of the axis CL1 when the inner circumferential teeth of the sleeve 88 and the outer circumferential teeth of the clutch gear 90 are meshed with each other and releasing meshing of the inner circumferential teeth of the sleeve 88 and the outer circumferential teeth of the clutch gear 90. Accordingly, the driving state is switched from the four-wheel driving state to the two-wheel driving state.

Switching of the gear stage of the sub transmission 54 by the H-L switch 140 (switching from the low-speed gear stage L to the high-speed gear stage H or switching from the high-speed gear stage H to the low-speed gear stage L) is performed under the conditions of a neutral range (N range) in which transmission of power of the automatic transmission 22 is cut off and a state in which the vehicle is stopped (that is, the vehicle speed V is zero). When the automatic transmission 22 is in the N range, transmission of power is cut off and thus the engine torque is not transmitted to the output shaft 42 of the automatic transmission 22 (transmission of a torque due to dragging of the clutches C or the brakes B is excluded). Accordingly, when the gear stage of the sub transmission 54 is switched, a shift load which is a force required for causing meshing teeth to mesh with each other (a load required for the shift actuator 92 to move the sleeve 85) decreases. Accordingly, the sleeve 85 can be moved to the meshing completion position at the time of switching the gear stage of the sub transmission 54.

In a transient switching period of the gear stage of the sub transmission 54, the switching passes through the power transmission cutoff state (the neutral state) in which both the low-speed engagement element 104 and the high-speed engagement element 102 are disengaged. At this time, both the automatic transmission 22 and the sub transmission 54 are in the neutral state, but when drag resistance of the frictional engagement element (such as the first clutch C1) which is engaged at a forward shift stage among the frictional engagement devices of the automatic transmission 22 is large, the engine rotation is transmitted to the output shaft 42 of the automatic transmission 22 and the input shaft 74 of the transfer 24 connected to the output shaft 42 also rotates. When the sleeve 85 moves to switch the gear stage of the sub transmission 54 in this state, a relative rotation speed between the rotary elements before and after the engagement (between the input shaft 74 and the first output shaft 60), that is, a relative rotation speed between the meshing teeth which mesh with each other, increases and thus gear noise or shock which is generated during switching may be greater. The rotation speed of the first output shaft 60 is zero because the vehicle is stopped.

In order to prevent this gear noise or shock, when the automatic transmission 22 is switched to the N range, the rotation speed decrease control unit 152 is activated. When the vehicle is stopped, the shift position Psh is shifted to the N position, and the automatic transmission 22 is switched to the N range, the rotation speed decrease control unit 152 performs engagement control (rotation speed decrease control) of engaging or semi-engaging the fourth brake B4 of the automatic transmission 22. In other words, the fourth brake B4 is engaged or semi-engaged before switching of the gear stage is started. The fourth brake B4 is disposed between the third ring gear R3 of the third planetary gear mechanism 50 of the automatic transmission 22 and the case 52, decreases the rotation speed of the third sun gear S3 by engagement, and outputs the decreased rotation speed to the third carrier CA3, that is, the output shaft 42. That is, the fourth brake B4 is engaged or semi-engaged to decrease the rotation speed of the third sun gear S3 due to dragging of the first clutch C1. Accordingly, by engaging or semi-engaging the fourth brake B4, an increase in the rotation speed of the output shaft 42 of the automatic transmission 22 and the input shaft 74 of the transfer 24 connected to the output shaft 42 is suppressed. The fourth brake B4 corresponds to at least one frictional engagement device in the claims which is engaged or semi-engaged during the rotation speed decrease control.

Figure 6:
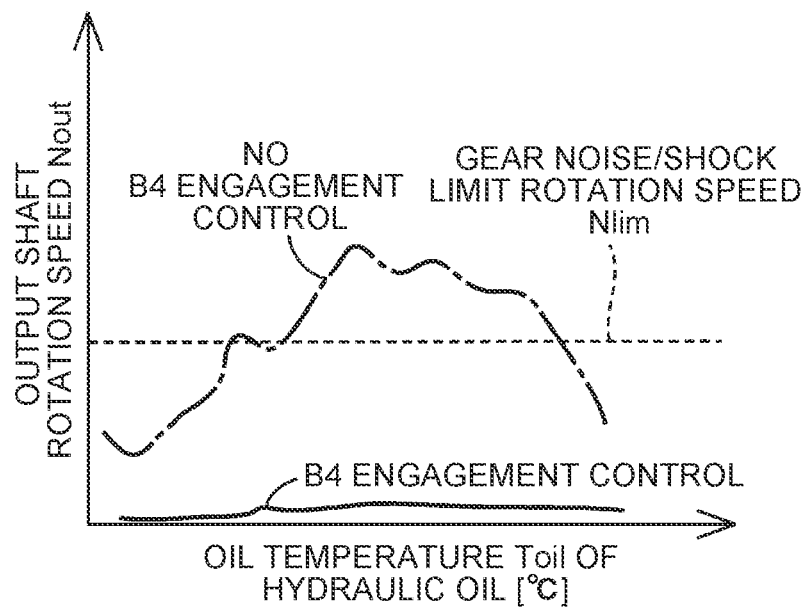
FIG. 6 is a diagram illustrating a rotation speed of an output shaft of the automatic transmission when a fourth brake is engaged or semi-engaged and a rotation speed of the output shaft when the fourth brake is disengaged.

FIG. 6 illustrates the output shaft rotation speed Nout of the output shaft 42 of the automatic transmission 22 when the fourth brake B4 is engaged or semi-engaged (B4 engagement control) and the output shaft rotation speed Nout when the fourth brake B4 is not engaged nor semi-engaged (no B4 engagement control) in the state in which the automatic transmission 22 is in the N range. In FIG. 6, the horizontal axis represents the oil temperature Toil of the hydraulic oil in the automatic transmission 22 and the vertical axis represents the output shaft rotation speed Nout of the automatic transmission 22.

As illustrated in FIG. 6, in the case of B4 engagement control indicated by a solid line, the rotation speed of the output shaft 42 is lower than in the case of no B4 engagement control indicated by a one-dot chain line. A rotation speed Nlim illustrated in FIG. 6 denotes a gear noise/shock limit rotation speed (hereinafter referred to as a limit rotation speed Nlim) which is acquired in advance by experiment or analysis. The limit rotation speed Nlim is a limit rotation speed at which a driver is considered not to feel discomfort due to gear noise or shock which is generated during switching of the gear stage of the sub transmission 54. That is, when the gear stage is switched such that the output shaft rotation speed Nout is less than the limit rotation speed Nlim, the relative rotation speed between the meshing teeth which mesh with each other in a transient switching period in the sub transmission 54 decreases and gear noise or shock decreases.

As illustrated in FIG. 6, in the case of B4 engagement control, the output shaft rotation speed Nout is lower than the limit rotation speed Nlim regardless of the oil temperature Toil of the hydraulic oil. Accordingly, even when the gear stage is switched in this state, gear noise or shock may not cause a driver to feel discomfort. On the other hand, in the case of no B4 engagement control, the output shaft rotation speed Nout is higher than the limit rotation speed Nlim in a predetermined range of the oil temperature Toil of the hydraulic oil. Accordingly, when the gear stage is switched in the range of the oil temperature Toil, gear noise or shock which is generated in the transient switching period increases and the driver may feel discomfort.

For this reason, when the gear stage of the sub transmission 54 is switched in a state in which the engagement control of the fourth brake B4 is performed by the rotation speed decrease control unit 152, the output shaft rotation speed Nout decreases and thus the relative rotation speed of the meshing teeth which mesh with each other decreases in the transient switching period of the sub transmission 54, thereby reducing gear noise or shock. However, since the drag torque Tf transmitted to the output shaft 42 increases and the shift load required for moving the sleeve 85 increases by engaging or semi-engaging the fourth brake B4, the sleeve 85 is not moved to the switching completion position at which the switched gear stage is established and there is concern that switching failure will occur.

Figure 7:
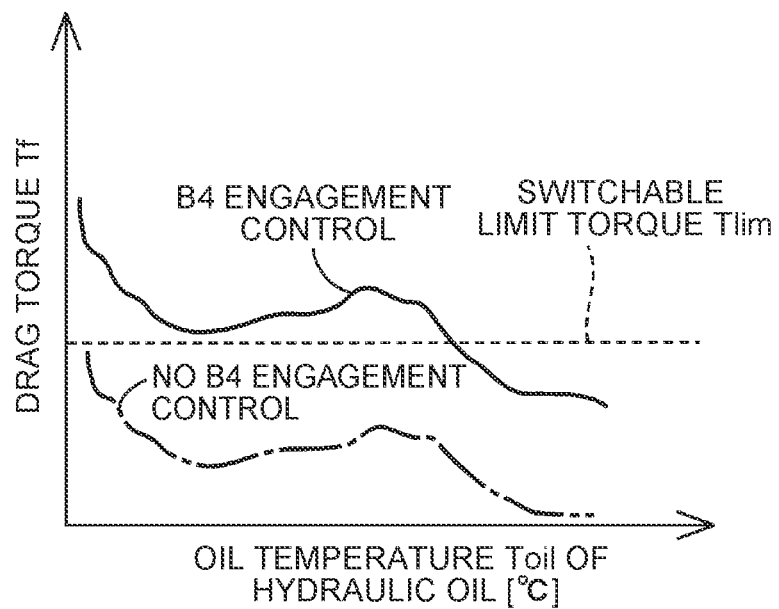
FIG. 7 is a diagram illustrating a relationship between an oil temperature of hydraulic oil in the automatic transmission and a drag torque output from the output shaft of the automatic transmission.

FIG. 7 illustrates a relationship between the oil temperature Toil of the hydraulic oil in the automatic transmission 22 and the drag torque Tf output from the output shaft 42 of the automatic transmission 22. In FIG. 7, the horizontal axis represents the oil temperature Toil of the hydraulic oil and the vertical axis represents the drag torque Tf. The solid line denotes the case of B4 engagement control, and the one-dot chain line denotes the case of no B4 engagement control. In FIG. 7, Tlim denotes a switchable limit torque Tlim. The switchable limit torque Tlim is a value which is set based on the output of the shift actuator 92 or the like, and is an upper limit with which the gear stage can be switched (the sleeve 85 can be moved to the switching completion position) by the shift actuator 92. That is, when the drag torque Tf is greater than the switchable limit torque Tlim, the sleeve 85 has difficulty in pressing the meshing teeth on the clutch gear side and moving to the switching completion position As illustrated in FIG. 7, in the case of no B4 engagement control, the drag torque Tf is less than the switchable limit torque Tlim regardless of the oil temperature Toil of the hydraulic oil and thus the gear stage of the sub transmission 54 can be switched. On the other hand, in a range in which the oil temperature Toil of the hydraulic oil is equal to or lower than a predetermined value, the drag torque Tf is greater than the switchable limit torque Tlim and thus there is concern that switching of the gear stage will be incomplete. On the other hand, when a shift actuator 92 having high output power is used, the switchable limit torque Tlim increases and the gear stage can be switched, but the shift actuator 92 increases in size.

Therefore, when a switching operation of switching the gear stage of the sub transmission 54 is performed and a high-low switching control signal Shl for switching the gear stage is output, the rotation speed decrease control unit 152 ends (releases) the engagement control of the fourth brake B4 during switching of the gear stage to disengage the fourth brake B4 (disengagement control). When the fourth brake B4 is disengaged in this way, the drag torque Tf decreases. Here, when the drag torque Tf is less than the switchable limit torque Tlim, the sleeve 85 can be moved to the switching completion position of the gear stage. That is, the gear stage can be switched. Accordingly, by moving the sleeve 85 located at a position at which the sub transmission 54 is in the power transmission cutoff state during disengagement of the fourth brake B4 and causing the meshing teeth which mesh with each other to mesh with each other (engaging the meshing engagement element) after the gear stage has been switched from the power transmission cutoff state, the drag torque Tf is less than the switchable limit torque Tlim, the meshing engagement element is engaged, and thus the gear stage is normally switched. During disengagement (in a disengaged state) of the fourth brake B4, a torque capacity of the fourth brake B4 is zero, but the fourth brake may have a predetermined torque capacity in a range in which movement of the sleeve 85 is possible.

When the engagement control of the fourth brake B4 by the rotation speed decrease control unit 152 is ended at the same time as outputting the high-low switching control signal Shl, the drag torque Tf decreases, but there is a likelihood that the output shaft rotation speed Nout increases and the output shaft rotation speed Nout will be greater than the limit rotation speed Nlim at an engagement start time point of the meshing engagement element. Therefore, the rotation speed decrease control unit 152 ends the engagement control of the fourth brake B4 at a time point at which a preset timer time Tt has elapsed from a time point at which a command for switching the gear stage (the high-low switching control signal Shl) is output (a time point at which an operation of switching the gear stage is performed).

The timer time Tt which is a period of time from the time point at which the command for switching the gear stage (the high-low switching control signal Shl) is output to the time point at which the engagement control (the rotation speed decrease control) of the fourth brake B4 is ended is acquired in advance by experiment or analysis. Specifically, the timer time Tt is set to a value with which the output shaft rotation speed Nout is lower than the limit rotation speed Nlim and the drag torque Tf is less than the switchable limit torque Tlim at the time point (the engagement start time point of the meshing engagement element) at which movement of the sleeve 85 is started with the output of the high-low switching control signal Shl based on a driver's switching operation of the H-L switch 140 and meshing of the meshing teeth of the sleeve 85 with the meshing teeth corresponding to the switched gear stage is started. Accordingly, by disengaging the fourth brake B4 at the time point at which the timer time Tt elapses, at the engagement start time point of the meshing engagement element, the output shaft rotation speed Nout is lower than the limit rotation speed Nlim and the drag torque Tf is less than the switchable limit torque Tlim. As a result, it is possible to decrease gear noise or shock which is generated in a transient engagement period (a transient meshing period) and to normally switch the gear stage.

Figure 8:
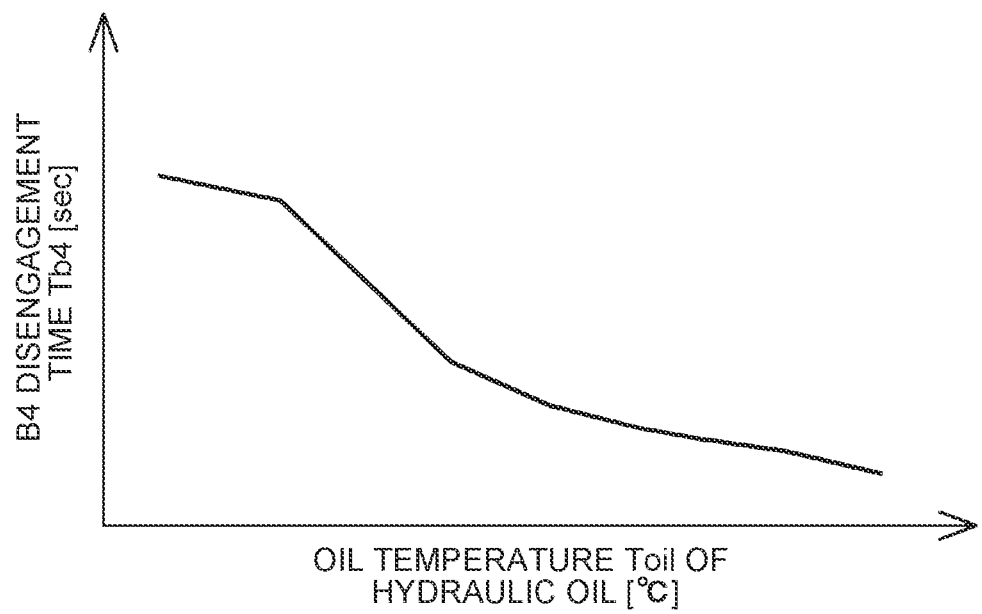
FIG. 8 is a diagram illustrating a relationship between an oil temperature of hydraulic oil and a disengagement time required until the fourth brake is switched from an engaged state to a disengaged state.

FIG. 8 illustrates a relationship between a disengagement time Tb4 required until the engagement control of the fourth brake B4 is ended and is switched to a disengaged state (zero torque capacity) and the oil temperature Toil of the hydraulic oil. In FIG. 8, the horizontal axis represents the oil temperature Toil of the hydraulic oil and the vertical axis represents the disengagement time Tb4 required until the fourth brake B4 is disengaged. As illustrated in FIG. 8, the disengagement time Tb4 increases as the oil temperature Toil decreases. This is because as the oil temperature Toil decreases, viscosity of the hydraulic oil increases and responsiveness of the hydraulic pressure decreases. Accordingly, the drag torque Tf is less likely to decrease as the oil temperature Toil decreases. In consideration of this, the timer time Tt is changed depending on the oil temperature Toil.

Figure 9:
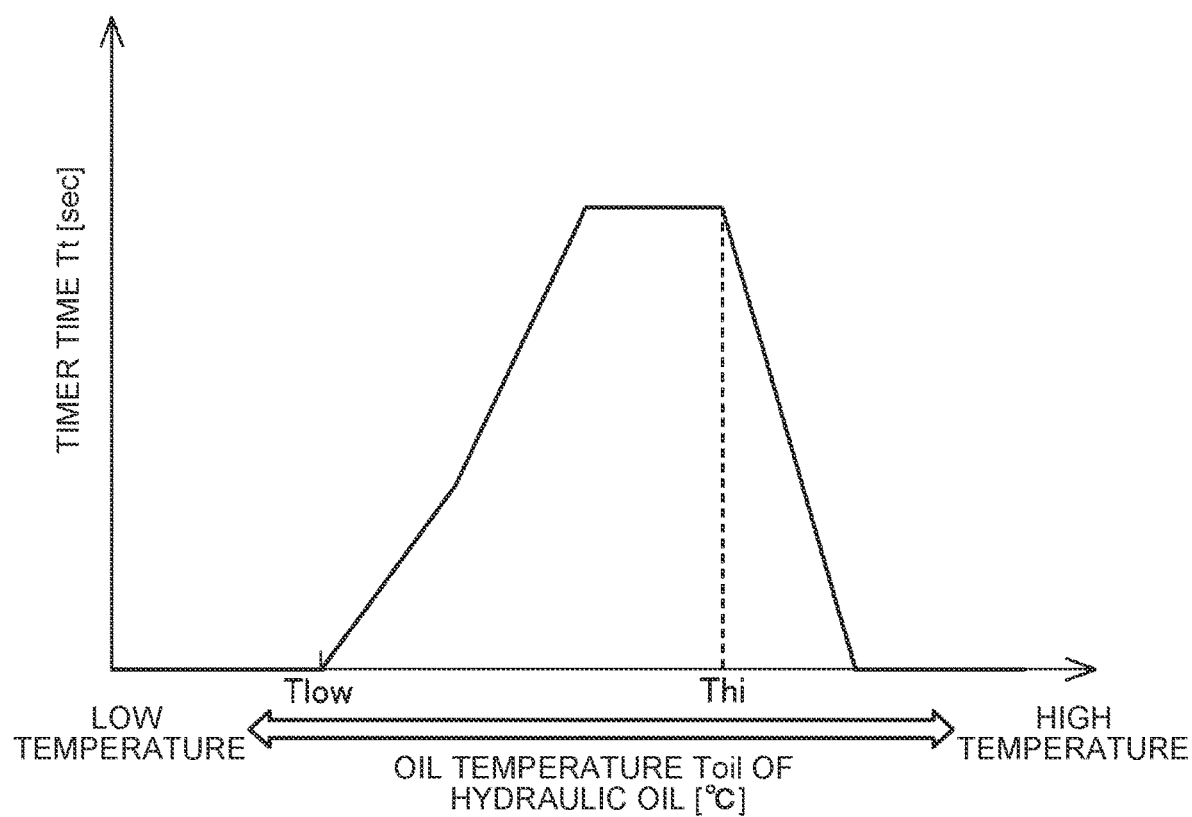
FIG. 9 is a map illustrating a relationship between an oil temperature of hydraulic oil and a timer time.

FIG. 9 is a map illustrating a relationship between the oil temperature Toil of hydraulic oil and the timer time Tt. In FIG. 9, the horizontal axis represents the oil temperature Toil of hydraulic oil and the vertical axis represents the timer time Tt. As illustrated in FIG. 9, the timer time Tt is zero in a low temperature range in which the oil temperature Toil is equal to or lower than a predetermined low temperature threshold value Tlow. That is, at the same time as outputting the command for switching the gear stage (the high-low switching control signal Shl), the engagement control of the fourth brake B4 by the rotation speed decrease control unit 152 is ended and the fourth brake B4 is disengaged.

This is because the disengagement time Tb4 increases in a state in which the oil temperature Toil is low as illustrated in FIG. 8. That is, in a state in which the oil temperature Toil is low, the time required until disengagement of the fourth brake B4 is started and the drag torque Tf is less than the switchable limit torque Tlim increases. Accordingly, in the low oil temperature range, by rapidly ending the engagement control of the fourth brake B4 by the rotation speed decrease control unit 152 to disengage the fourth brake B4 after the high-low switching control signal Shl is output, it is possible to cause the meshing teeth of the sleeve 85 to mesh with the meshing teeth of the clutch gear in the state in which the drag torque Tf is less than the switchable limit torque Tlim and to complete switching of the gear stage. When the engagement control of the fourth brake B4 is rapidly ended, the output shaft rotation speed Nout rapidly starts increasing, but the output shaft rotation speed Nout is controlled at a low rotation speed in advance by the engagement control of the fourth brake B4, and hydraulic pressure responsiveness of the fourth brake B4 is poor and an increasing gradient of the output shaft rotation speed Nout is small in a low oil temperature state. Accordingly, the output shaft rotation speed Nout does not exceed the limit rotation speed Nlim.

When the oil temperature Toil of hydraulic oil is equal to or higher than the low temperature threshold value Tlow, the timer time Tt increases as the oil temperature Toil increases. This is because as the oil temperature Toil increases, the disengagement time Tb4 decreases as illustrated in FIG. 8. That is, in consideration that as the oil temperature Toil increases, the fourth brake B4 is more rapidly disengaged and the increasing gradient of the output shaft rotation speed Nout increases, the timer time Tt is set to be longer as the oil temperature Toil becomes higher such that the output shaft rotation speed Nout does not exceed the limit rotation speed Nlim at the time point (the engagement start time point of the meshing engagement element) at which meshing of the meshing teeth of the sleeve 85 with the meshing teeth of the clutch gear is started. Accordingly, by ending the engagement control of the fourth brake B4 by the rotation speed decrease control unit 152 and disengaging the fourth brake B4 at a time point at which the timer time Tt elapses after the high-low switching control signal Shl is output, it is possible to move the sleeve 85 to cause the meshing teeth to mesh with each other in a state in which the output shaft rotation speed Nout does not exceed the limit rotation speed Nlim.

When the oil temperature Toil is equal to or higher than a high temperature threshold value Thi, the timer time Tt decreases as the oil temperature toil increases. When the oil temperature Toil is high, viscosity of the hydraulic oil decreases, dragging in the frictional engagement device of the automatic transmission 22 decreases, and thus the drag torque Tf decreases. Since the dragging in the frictional engagement device decreases, the output shaft rotation speed Nout is not likely to increase. Accordingly, even when the timer time Tt decreases, the drag torque Tf does not exceed the switchable limit torque Tlim and the output shaft rotation speed Nout does not exceed the limit rotation speed Nlim. As a result, in a state in which the oil temperature Toil is high, the timer time Tt decreases as the oil temperature Toil increases and thus it is possible to achieve coexistence of a decrease in gear noise and shock and improvement in switchability of the gear stage.

Referring to FIG. 5 again, the timer time determining unit 154 starts counting of an elapsed time Tcon from the time point at which the high-low switching control signal Shl for switching the gear stage (a time point at which switching of the gear stage is started and a time point at which the H-L switch 140 is operated) and determines whether the elapsed time Tcon reaches the timer time Tt. When the timer time determining unit 154 determines that the elapsed time Tcon reaches the timer time Tt, the rotation speed decrease control unit 152 ends the engagement control of the fourth brake B4 and disengages the fourth brake B4 (release of engagement control, disengagement control). Accordingly, the drag torque Tf decreases.

The oil temperature sensor malfunction determining unit 155 determines whether an malfunction has occurred in the oil temperature sensor 144 that detects the oil temperature Toil of hydraulic oil. When a signal is not output from the oil temperature sensor 144, when the oil temperature Toil detected by the oil temperature sensor 144 is higher than a predetermined normality upper limit, and when the oil temperature Toil is lower than a predetermined normality lower limit, the oil temperature sensor malfunction determining unit 155 determines that an malfunction has occurred in the oil temperature sensor 144. The oil temperature sensor 144 corresponds to the temperature detector in the claims.

When it is determined that malfunction has occurred in the oil temperature sensor 144, the oil temperature sensor malfunction determining unit 155 outputs a command for setting the timer time Tt to zero to the timer time determining unit 154. Accordingly, when it is determined that malfunction has occurred in the oil temperature sensor 144, it is difficult to set the timer time Tt based on the oil temperature Toil but the timer time Tt is set to zero in this case. In this way, by setting the timer time Tt to zero, the rotation speed decrease control unit 152 ends the engagement control of the fourth brake B4 and disengages the fourth brake B4 when malfunction has occurred in the oil temperature sensor 144. Accordingly, since the output shaft rotation speed Nout increases but the drag torque Tf of the automatic transmission 22 decreases, the gear stage can be switched. That is, when malfunction has occurred in the oil temperature sensor 144, priority is given to switching of the gear stage more than the decrease in gear noise or shock, and the gear stage can be switched even when malfunction has occurred in the oil temperature sensor 144.

The shift operation determining unit 156 determines whether a shift operation to a shift position other than the N position has been performed by a driver during disengagement of the fourth brake B4 after the engagement control of the fourth brake B4 by the rotation speed decrease control unit 152 is ended. When the shift operation determining unit 156 determines that a shift operation from the N position to a shift position (a D position or the like) other than the N position has been performed, a command for shifting the automatic transmission to a shift range corresponding to the operated shift position Psh is output and the automatic transmission 22 is shifted to the shift range other than the N range. At this time, the gear shift control of the automatic transmission 22 is preferentially performed and the rotation speed decrease control unit 152 ends the disengagement control of the fourth brake B4 and is not returned to engagement control of the fourth brake B4. That is, the rotation speed decrease control unit 152 does not perform any control for the fourth brake B4 so as not to interfere with the gear shift of the automatic transmission 22. For example, when the shift range of the automatic transmission 22 is accompanied by engagement of the fourth brake B4, the engagement control of the fourth brake B4 is performed. When the shift range of the automatic transmission 22 is not accompanied by the engagement control of the fourth brake B4, the disengagement control of the fourth brake B4 by the rotation speed decrease control unit 152 is ended, but the disengagement of the fourth brake B4 is maintained. The switching of the gear stage is completed in a transient gear shift period of the automatic transmission 22.

The elapsed time determining unit 158 determines whether the elapsed time Tcon from the time point (the switching start time point of the gear stage) at which the high-low switching control signal Shl is output is equal to or less than a predetermined threshold value T1. When the elapsed time determining unit 158 determines that the elapsed time Tcon is greater than the threshold value T1, a command for engaging or semi-engaging the fourth brake B4 is output to the rotation speed decrease control unit 152. The threshold value T1 is set in advance by experiment or analysis, and is set to a time in consideration of a predetermined margin of a time in which switching of the gear stage of the sub transmission 54 is considered to be completed. That is, the threshold value T1 is set to a time in which switching of the gear stage is generally completed. When the elapsed time Tcon is greater than the threshold value T1, there is a likelihood that switching of the gear stage will not be completed for some reasons and the output shaft rotation speed Nout will exceed the limit rotation speed Nlim. In this case, in order to decrease the output shaft rotation speed Nout, the rotation speed decrease control unit 152 performs the engagement control of the fourth brake B4 to return to a state before the switching is started.

Figure 10:
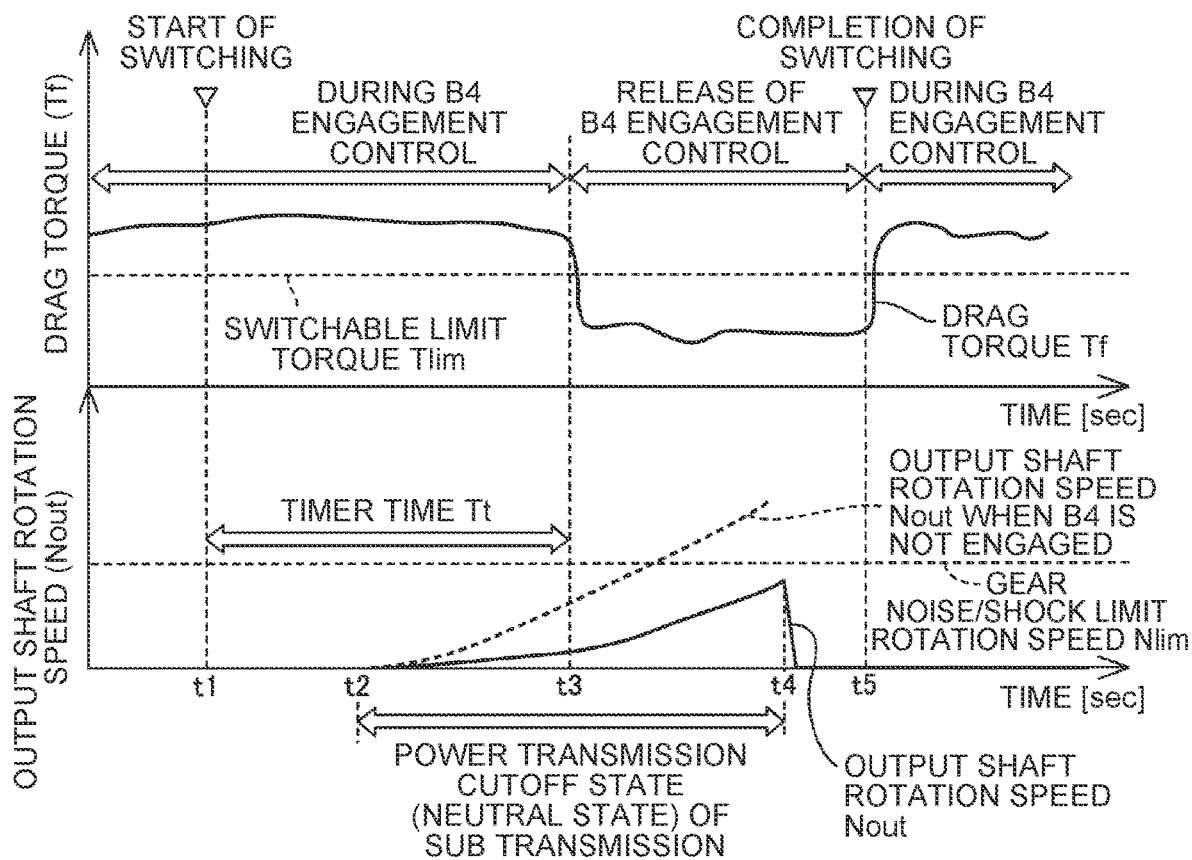
FIG. 10 is a timing chart illustrating an operation state when a gear stage of a sub transmission is switched from a high-speed gear stage to a low-speed gear stage in a state in which the vehicle is stopped and the automatic transmission is in a neutral state.

FIG. 10 is a timing chart illustrating an operation state when the vehicle is stopped, the automatic transmission 22 is in the N range (the neutral state), and the gear stage of the sub transmission 54 is switched from the high-speed gear stage H to the low-speed gear stage L. Before a time point t1 at which switching of the gear stage is started, by performing the engagement control of the fourth brake B4 by the rotation speed decrease control unit 152, the drag torque Tf exceeds the switchable limit torque Tlim. By shifting the sub transmission 54 to the high-speed gear stage H, the output shaft rotation speed Nout is zero.

When an operation of switching the H-L switch 140 is performed at a time point t1, the high-low switching control signal Shl is output and switching of the gear stage by the switching control unit 150 is started. Specifically, reclamping of the first meshing clutch device 62 due to driving of the shift actuator 92, that is, movement of the sleeve 85 from the switching completion position at which the high-speed gear stage H is established to the switching completion position at which the low-speed gear stage L is established, is started. The engagement of the high-speed engagement element 102 is disengaged with movement of the sleeve 85 to the switching completion position at which the low-speed gear stage L is established, and thus the sub transmission 54 is switched to the power transmission cutoff state (the neutral state) at a time point t2. The power transmission cutoff state of the sub transmission 54 is maintained between a time point at which meshing of the meshing teeth is disengaged and a time point (a time point t4) at which meshing with the meshing teeth for establishing the low-speed gear stage L.

When the sub transmission 54 is switched to the power transmission cutoff state, connection to the driving wheel side is cut off, resistance applied to the output shaft 42 of the automatic transmission 22 disappears, and thus the output shaft rotation speed Nout of the automatic transmission 22 increases. Here, since the engagement control of the fourth brake B4 is performed by the rotation speed decrease control unit 152, the increase of the output shaft rotation speed Nout is slowed down as indicated by a solid line. On the other hand, when the engagement control of the fourth brake B4 is not performed by the rotation speed decrease control unit 152, the increasing gradient of the output shaft rotation speed Nout increases in comparison with the case in which the engagement control of the fourth brake B4 is performed as indicated by a dotted line.

At a time point t3, when the elapsed time Tcon from the switching start time point of the gear stage (the time point t1) reaches the timer time Tt, the engagement control of the fourth brake B4 by the rotation speed decrease control unit 152 is ended and the fourth brake B4 is disengaged. Accordingly, from the time point t3, the drag torque Tf decreases and the drag torque Tf becomes less than the switchable limit torque Tlim. Since the fourth brake B4 is disengaged, the increasing gradient of the output shaft rotation speed Nout is greater than before the time point t3.

At a time point t4, meshing of the meshing teeth (the inner circumferential teeth 78*l*) of the clutch gear 78 corresponding to the low-speed gear stage L with the meshing teeth (the outer circumferential teeth 85*l*) of the sleeve 85, that is, engagement of the low-speed engagement element 104, is started. At this time, since the drag torque Tf is less than the switchable limit torque Tlim and the output shaft rotation speed Nout is lower than the limit rotation speed Nlim, it is possible to decrease gear noise or shock and to engage the meshing engagement element (to mesh the meshing teeth). On the other hand, when the engagement control of the fourth brake B4 by the rotation speed decrease control unit 152 is not performed, the meshing of the meshing teeth is started in a state in which the output shaft rotation speed Nout exceeds the limit rotation speed Nlim and thus gear noise or shock increases.

At a time point t5, when the sleeve 85 moves to the switching completion position at which the low-speed gear stage L is established, it is determined that the switching of the gear stage is completed and the control is returned to the same engagement control of the fourth brake B4 by the rotation speed decrease control unit 152 as before the switching is started. An example in which the gear stage is switched from the high-speed gear stage H to the low-speed gear stage L has been described above, but the same operation is basically performed even when the gear stage is switched from the low-speed gear stage L to the high-speed gear stage H, except that the switching direction of the gear stage is reversed.

Figure 11:
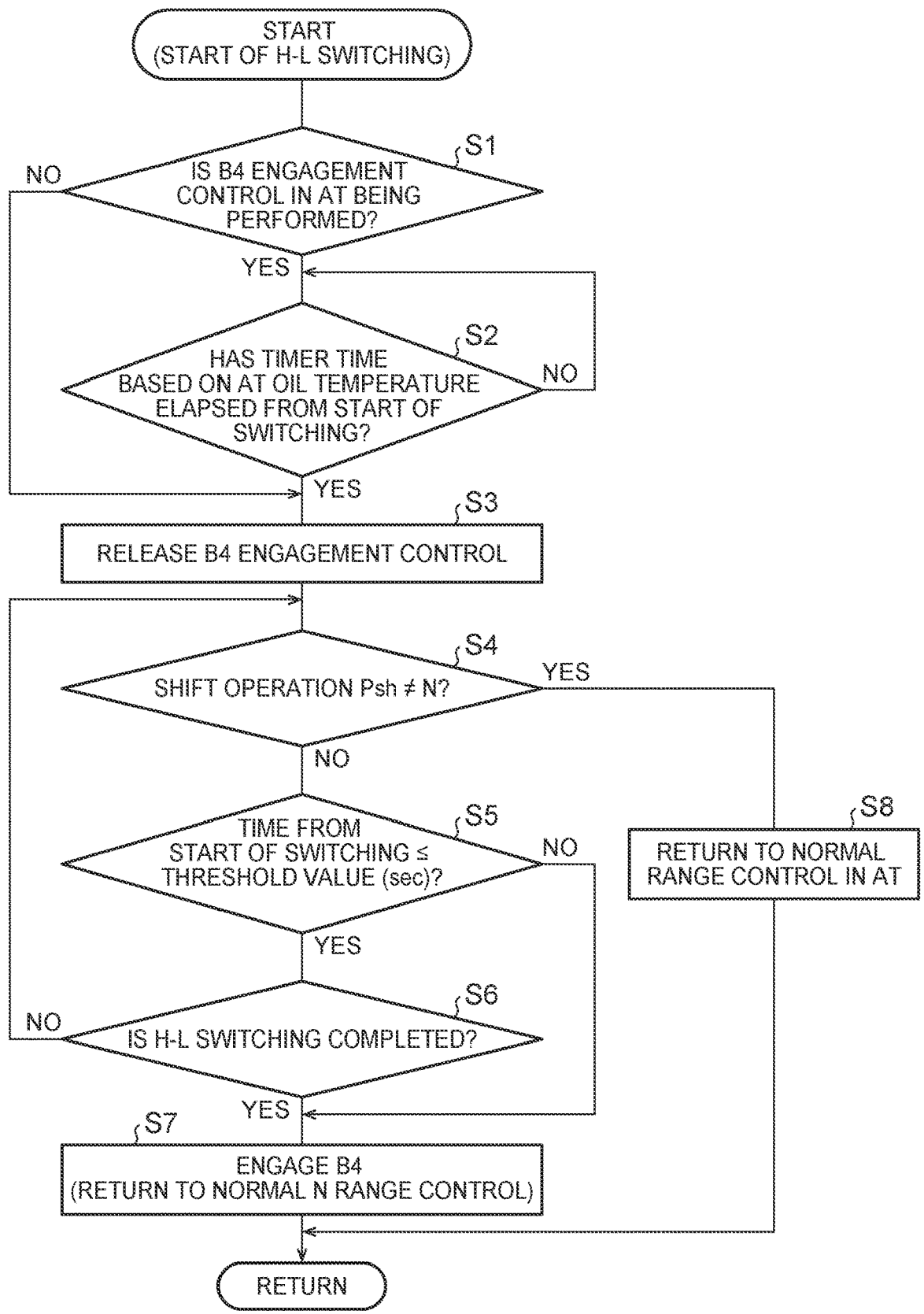
FIG. 11 is a flowchart illustrating a principal part of a control operation of an electronic control unit, specifically, a control operation related to switching of a gear stage in the sub transmission.

FIG. 11 is a flowchart illustrating a principal part of the control operation of the electronic control unit 130, specifically, the control operation associated with switching of the gear stage of the sub transmission 54. This flowchart is performed whenever the command for switching the gear stage of the sub transmission 54 (the high-low switching control signal Shl) is output.

When the H-L switch 140 is operated by a driver in a state in which the vehicle is stopped and the automatic transmission 22 is in the N range and the high-low switching control signal Shl for switching the gear stage of the sub transmission 54 is output, switching of the gear stage is started. In Step S1 (hereinafter Step is omitted) corresponding to the control function of the rotation speed decrease control unit 152, it is determined whether the engagement control of the fourth brake B4 is being performed. When the engagement control of the fourth brake B4 is not being performed, the determination result of S1 is negative and S3 is performed. When the engagement control of the fourth brake B4 is being performed, the determination result of S1 is positive and S2 is performed.

In S2 corresponding to the control function of the timer time determining unit 154, it is determined whether the elapsed time Tcon from the switching start time point of the gear stage reaches the timer time Tt. The timer time Tt is appropriately changed depending on the oil temperature Toil of hydraulic oil. When the elapsed time Tcon does not each the timer time Tt, the determination result of S2 is negative, the elapsed time Tcon is continuously counted, and S2 is repeatedly performed until the elapsed time Tcon reaches the timer time Tt. When the elapsed time Tcon reaches the timer time Tt, the determination result of S2 is positive and S3 is performed.

In S3 corresponding to the control function of the rotation speed decrease control unit 152, the engagement control of the fourth brake B4 is ended (the B4 engagement control is released), and the fourth brake B4 is disengaged. Accordingly, the drag torque Tf decreases. In S4 corresponding to the control function of the shift operation determining unit 156, it is determined whether a shift operation to a shift position other than the N range has been performed by a driver. When a shift operation to a shift position other than the N range has been performed by a driver, the determination result of S4 is positive and S8 is performed. In S8, gear shift control to the shift range corresponding to the shift position Psh subjected to the shift operation is performed and the disengagement control of the fourth brake B4 is ended. When the shift operation has not been performed, the determination result of S4 is negative and S5 is performed.

In S5 corresponding to the control function of the elapsed time determining unit 158, it is determined whether the elapsed time Tcon from the switching start time point of the gear stage is equal to or less than a predetermined threshold value T1. When the elapsed time Tcon is equal to or less than the threshold value T1, the determination result of S4 is positive and S6 is performed. In S6 corresponding to the control function of the switching control unit 150, it is determined whether switching of the gear stage has been completed. The determination of whether switching of the gear stage has been completed is performed based on whether the position of the sleeve 85 reaches a predetermined switching completion position of the gear stage, for example, by providing a sensor for detecting the position of the sleeve 85.

When it is determined that switching of the gear stage has not been completed, the determination result of S6 is negative and S4 is performed again. When it is determined that switching of the gear stage has been completed, the determination result of S6 is positive and S7 is performed. In S7 corresponding to the control function of the rotation speed decrease control unit 152, the control is returned to the engagement control of the fourth brake B4. When it is determined in S5 that the elapsed time Tcon is greater than the threshold value T1, the determination result of S5 is negative and S7 is performed. That is, it is determined that switching of the gear stage has not been completed for some reasons and the control is returned to the engagement control of the fourth brake B4 in the automatic transmission 22 which has been performed before the switching operation.

Figure 12:
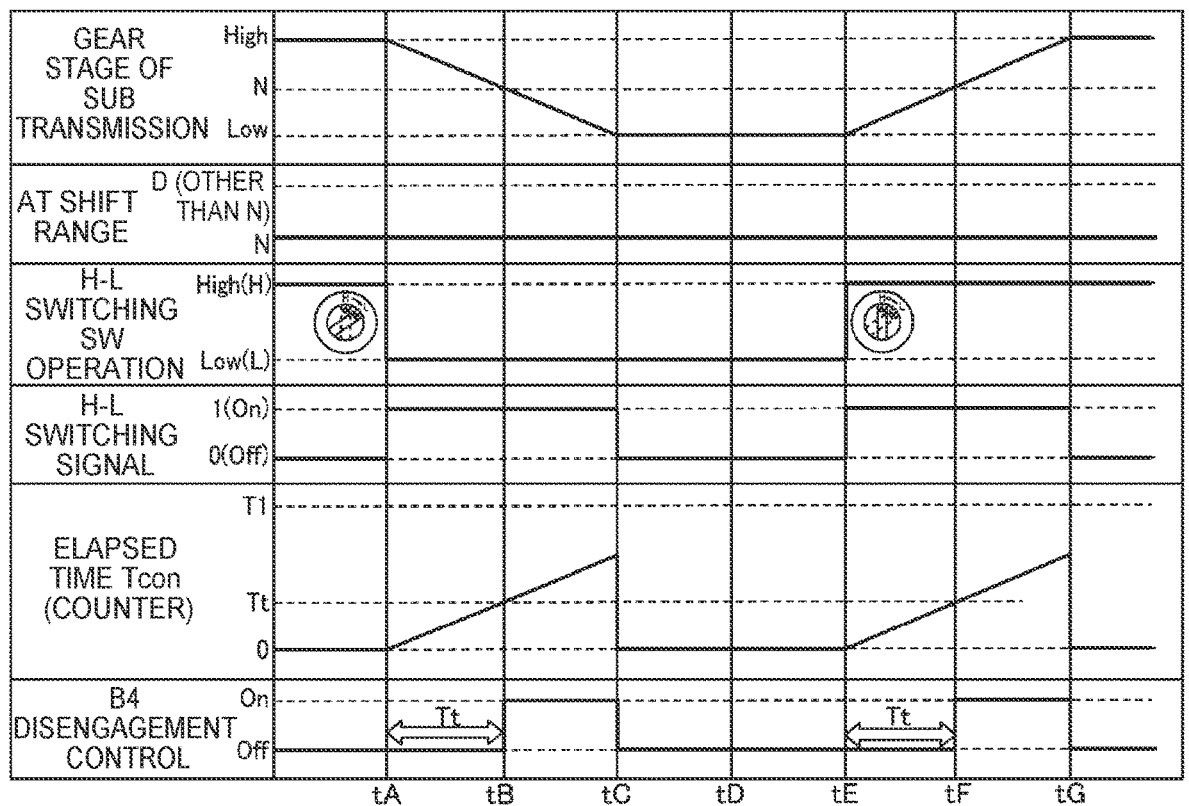
FIG. 12 is a timing chart illustrating a control state when an H-L switch is operated.

FIG. 12 is a timing chart illustrating a control state when the H-L switch 140 is operated while the vehicle is stopped. In FIG. 12, the horizontal axis represents time. The sub transmission gear stage denotes a gear stage state of the sub transmission 54, "High" corresponds to the high-speed gear stage H, and "Low" corresponds to the low-speed gear stage L. the AT shift range denotes the shift range of the automatic transmission 22, where N denotes the neutral range (the N range) and D denotes a forward traveling range. The H-L switching SW operation denotes the operation position of the H-L switch 140, where "High" corresponds to the operation position of the high-speed gear stage H and "Low" corresponds to the operation position of the low-speed gear stage L. The H-L switching signal corresponds to a control signal output during switching of the gear stage of the sub transmission 54, and the elapsed time Tcon is counted while this signal is outputting. The B4 disengagement control denotes the control state of the fourth brake B4, where "Off" denotes that the engagement control of the fourth brake B4 is being performed and "On" denotes that release of the engagement control of the fourth brake B4, that is, the disengagement control of the fourth brake B4, is being performed.

In FIG. 12, before a time point tA, the high-speed engagement element 102 is engaged and thus the sub transmission 54 is shifted to the high-speed gear stage H. The shift position Psh is shifted to the N position, the shift range of the automatic transmission 22 (the At shift range) is shifted to the N range (the power transmission cutoff state), and the engagement control of the fourth brake B4 is performed in advance.

When the H-L switch 140 is switched to the low-speed gear stage L side by a driver at the time point tA, switching control to the low-speed gear stage L is started. Specifically, movement of the sleeve 85 to the switching completion position at which the low-speed gear stage L is established is started. Counting of the elapsed time Tcon from the time point tA is started. The elapsed time Tcon is counted while the H-L switching control signal Shl is being output, and is reset to zero when switching of the gear stage is completed. Between the time point tA to a time point tB, the sleeve 85 moves to disengage the high-speed engagement element 102, and transmission of power in the sub transmission 54 is transiently cut off.

At the time point tB, when the elapsed time Tcon from the switching start time point (the time point tA) reaches the timer time Tt, the engagement control of the fourth brake B4 is ended (release of engagement control) and the fourth brake B4 is disengaged (disengagement control). Accordingly, the drag torque Tf which is generated in the automatic transmission 22 decreases and the drag torque Tf becomes less than the switchable limit torque Tlim at a meshing start time point of the sleeve 85 (the engagement start time point of the low-speed engagement element 104). Since the engagement control of the fourth brake B4 is ended after the timer time Tt elapses, the output shaft rotation speed Nout becomes less than the limit rotation speed Nlim at the meshing start time point of the sleeve 85. Accordingly, gear noise or shock decreases and switching of the gear stage is prevented from being incomplete. At a time point tC, when the sleeve 85 moves to the switching completion position at which the low-speed gear stage L is established, it is determined that switching of the gear stage is completed and the control is returned to the engagement control of the fourth brake B4. The elapsed time Tcon is reset to zero.

At a time point tE, when the H-L switch 140 is returned to the high-speed gear stage H, the switching control to the high-speed gear stage H is started and movement of the sleeve 85 to the switching completion position at which the high-speed gear stage H is established is started. Counting of the elapsed time Tcon from the time point tE is started. When the movement of the sleeve 85 is started, the low-speed engagement element 104 is disengaged and transmission of power in the sub transmission 54 is cut off.

At a time point tF, when the elapsed time Tcon from the switching start reaches the timer time Tt, the engagement control of the fourth brake B4 is ended and the fourth brake B4 is disengaged (disengagement control). Accordingly, the drag torque Tf which is generated in the automatic transmission 22 decreases and the drag torque Tf becomes less than the switchable limit torque Tlim at the meshing start time point of the sleeve 85. Since the engagement control of the fourth brake B4 is ended after the timer time Tt elapses, the output shaft rotation speed Nout becomes less than the limit rotation speed Nlim at the meshing start time point of the sleeve 85. At a time point tG, when the sleeve 85 moves to the switching completion position at which the high-speed gear stage H is established, it is determined that switching of the gear stage is completed and the control is returned to the engagement control of the fourth brake B4.

As described above, when the switching control of switching the gear stage of the sub transmission 54 is started and the elapsed time Tcon from the switching control start time is greater than the timer time Tt, the engagement control of the fourth brake B4 is ended (released), and the drag torque Tf is less than the switchable limit torque Tlim and the output shaft rotation speed Nout is lower than the limit rotation speed Nlim at the time point at which engagement of the meshing engagement element which is engaged after the switching is started. Accordingly, it is possible to decrease gear noise or shock which is generated when the meshing teeth of the sleeve 85 mesh with the meshing teeth of the clutch gear and to satisfactorily cause the meshing teeth of the sleeve 85 to mesh with the meshing teeth of the clutch gear.

Figure 13:
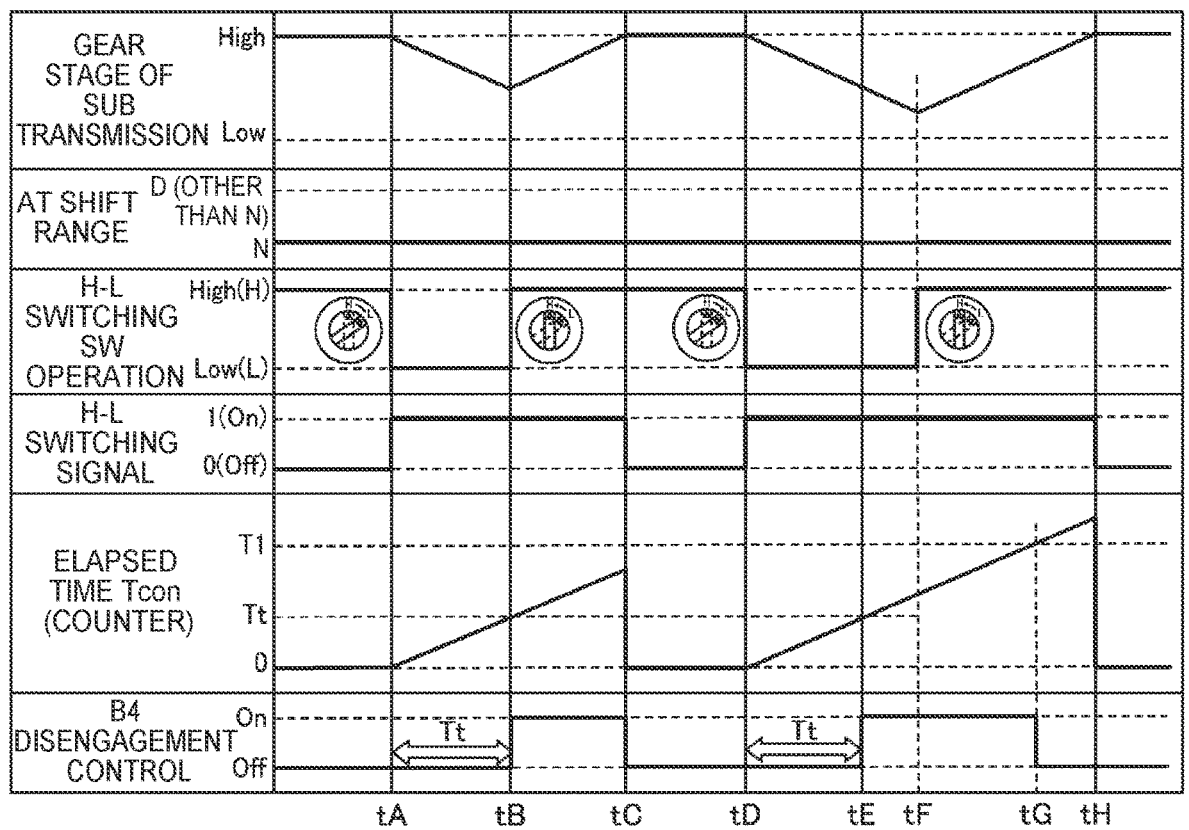
FIG. 13 is another timing chart illustrating a control state when the H-L switch is operated.

FIG. 13 is a timing chart illustrating the control state when the H-L switch 140 is operated, where an example in which the H-L switch 140 is re-operated during switching of the sub transmission 54 is illustrated.

In FIG. 13, before a time point tA, the high-speed engagement element 102 is engaged and thus the sub transmission 54 is shifted to the high-speed gear stage H. The shift position Psh is shifted to the N position, the shift range of the automatic transmission 22 (the AT shift range) is shifted to the N range (the power transmission cutoff state), and the engagement control of the fourth brake B4 is performed in advance.

When the H-L switch 140 is switched to the low-speed gear stage L side by a driver at the time point tA, switching control to the low-speed gear stage L is started. Specifically, movement of the sleeve 85 to the switching completion position at which the low-speed gear stage L is established is started. Counting of the elapsed time Tcon from the time point tA is started. Between the time point tA and a time point tB, the sleeve 85 starts moving to release meshing of the meshing teeth for establishing the high-speed gear stage H, and transmission of power in the sub transmission 54 is transiently cut off.

When the elapsed time Tcon reaches the timer time Tt at the time point tB and the H-L switch 140 is re-operated to the high-speed gear stage H side, movement of the sleeve 85 to the switching completion position at which the high-speed gear stage H is established is started after the time point tB. That is, the sleeve 85 starts moving to the original position. Here, since the elapsed time Tcon reaches the timer time Tt, the engagement control of the fourth brake B4 is ended (release of engagement control) regardless of the re-operation of the H-L switch 140 and the fourth brake B4 is disengaged (disengagement control).

At a time point tC, when the sleeve 85 moves to the switching completion position at which the high-speed gear stage H is established, it is determined that switching of the gear stage is completed and the control is returned to the engagement control of the fourth brake B4. The elapsed time Tcon is reset to zero.

At a time point tD, when the H-L switch 140 is shifted to the low-speed gear stage L, movement of the sleeve 85 to the switching completion position at which the low-speed gear stage L is established is started. At this time, counting of the elapsed time Tcon is started. At a time point tE, when the elapsed time Tcon reaches the timer time Tt, the engagement control of the fourth brake B4 is ended and the fourth brake B4 is disengaged.

At a time point tF, when the H-L switch 140 is re-operated to the high-speed gear stage H side, movement of the sleeve 85 to the switching completion position at which the high-speed gear stage H is established is started. At a time point tG when the elapsed time Tcon reaches the threshold value T1, there is a likelihood that switching of the gear stage will not be completed for some reasons and the output shaft rotation speed Nout will be high due to extending of the disengagement time of the fourth brake B4, and the output shaft rotation speed Nout decreases. Accordingly, the control is returned to the engagement control of the fourth brake B4 which has been performed before the switching operation. At a time point tH, when the sleeve 85 moves to the switching position at which the high-speed gear stage H is established, it is determined that switching of the gear stage is completed and the elapsed time Tcon is reset to zero.

Figure 14:
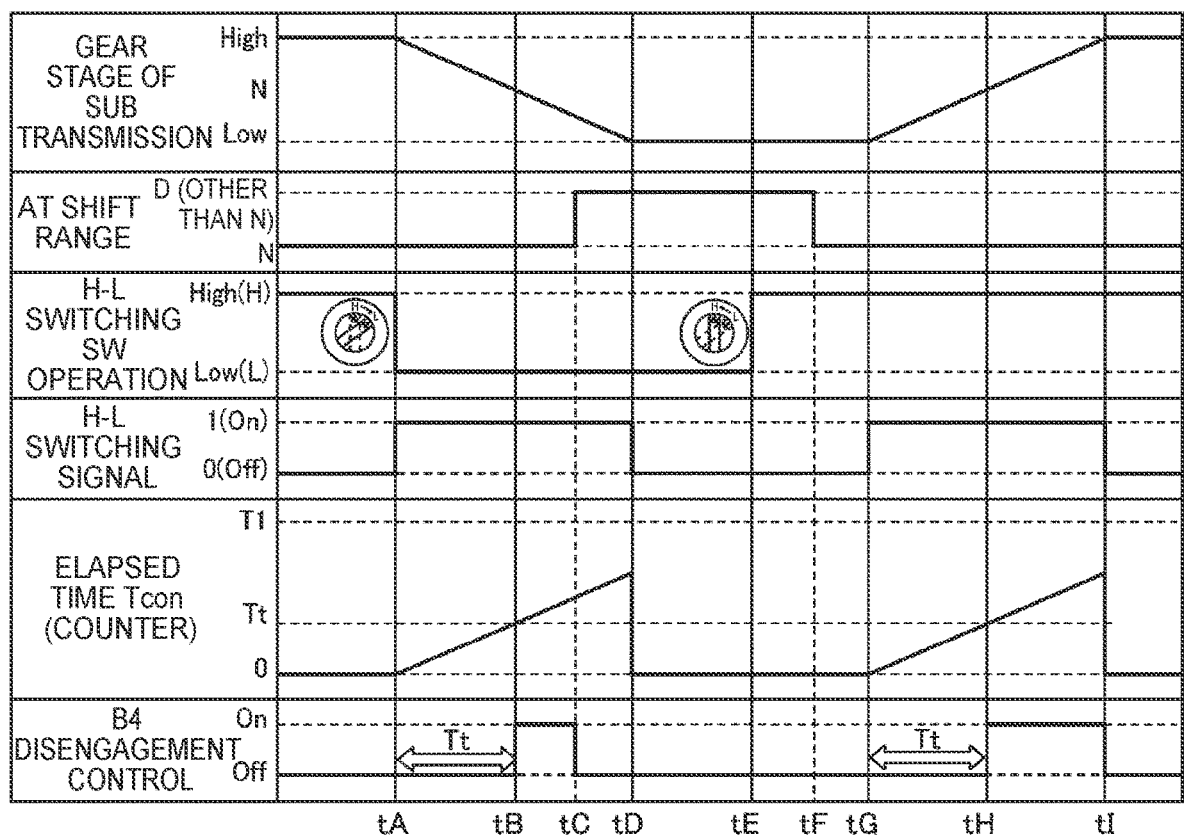
FIG. 14 is a still another timing chart illustrating a control state when the H-L switch is operated.

FIG. 14 is a timing chart illustrating the control state when the H-L switch 140 is operated, where an example in which the automatic transmission 22 is shifted to the D range (the forward traveling range) while switching the gear stage of the sub transmission 54 is illustrated.

When the H-L switch 140 is switched to the low-speed gear stage L side by a driver at the time point tA, switching control to the low-speed gear stage L is started and movement of the sleeve 85 to the switching completion position at which the low-speed gear stage L is established is started. Counting of the elapsed time Tcon from the time point tA is started.

At the time point tB, when the elapsed time Tcon reaches the timer time Tt, the engagement control of the fourth brake B4 is ended (release of engagement control) and the fourth brake B4 is disengaged (disengagement control). When the shift range of the automatic transmission 22 is switched from the N range to the D range at a time point tC, the gear shift control of the automatic transmission 22 is preferentially performed and the disengagement control of the fourth brake B4 is released. When the shift range of the automatic transmission 22 is not accompanied by engagement of the fourth brake B4, disengagement of the fourth brake B4 is maintained.

At the time point tD, when the sleeve 85 moves to the switching completion position at which the low-speed gear stage L is established, it is determined that switching of the gear stage is completed and the elapsed time Tcon is reset to zero. At a time point tE, since the H-L switch 140 is operated to the high-speed gear stage H but the automatic transmission 22 is in the D range, the high-low switching control signal Shl for switching the gear stage is not output and switching of the gear stage is not started.

At a time point tF, when the automatic transmission 22 is switched from the D range to the N range, switching of the gear stage is started at a time point tG at which a predetermined time has elapsed. Switching of the gear stage is not started at the time point tF at which the automatic transmission 22 is switched to the N range, because it should be ascertained that a driver does not immediately shift the shift position to a range other than the N range. The control after the time point tG is the same as in the above-mentioned example and description thereof will not be repeated.

As described above, according of this embodiment, since the rotation speed decrease control is performed at the time of switching the gear stage of the sub transmission 54 and the output shaft rotation speed Nout of the automatic transmission 22 decreases, the rotation speed difference between the rotary elements of the sub transmission 54 decreases and gear noise or shock which is generated during the switching decreases. Since the fourth brake B4 is disengaged by ending the rotation speed decrease control during switching of the sub transmission 54, the drag torque Tf transmitted to the output shaft 42 of the automatic transmission 22 decreases. By starting engagement of the meshing engagement element which is engaged after the gear stage of the sub transmission 54 is switched in this state, it is possible to decrease a shift load required for the switching and to improve switchability.

According to this embodiment, when the oil temperature Toil of hydraulic oil is equal to or higher than the low temperature threshold value Tlow, the rotation speed of the output shaft 42 of the automatic transmission 22 increases faster at the time point at which the rotation speed decrease control is ended as the oil temperature Toil of hydraulic oil increases. Accordingly, by setting the timer time Tt, which is a period from a time point at which the command for switching the gear stage of the sub transmission 54 is output to a time point at which the rotation speed decrease control is ended, to be longer as the oil temperature Toil becomes higher, the rotation speed difference between the rotary elements of the sub transmission 54 at the time point at which meshing of the meshing teeth is started can be reduced regardless of the oil temperature Toil.

According to this embodiment, when malfunction has occurred in the oil temperature sensor 144, the rotation speed decrease control is ended (stopped). Accordingly, the drag torque Tf transmitted to the output shaft 42 of the automatic transmission 22 is decreased and the gear stage can be switched even in a state in which the oil temperature Toil is low.

While an embodiment of the disclosure has been described above in detail with reference to the accompanying drawings, the disclosure can be applied to other aspects.

For example, in the above-mentioned embodiment, the timer time Tt is changed depending on the oil temperature Toil of hydraulic oil, but it is not necessary to change the timer time depending on the oil temperature Toil and the timer time Toil may be a fixed value regardless of the oil temperature Toil.

In the above-mentioned embodiment, the rotation speed decrease control unit 152 performs the engagement control of the fourth brake B4 when the automatic transmission 22 is shifted to the N range in a state in which the vehicle is stopped, but may perform the engagement control of the fourth brake B4 at a time point at which the switching operation of switching the gear stage of the sub transmission 54 is performed (at a time point at which the high-low switching control signal Shl is output).

In the above-mentioned embodiment, when the rotation speed decrease control unit 152 is activated, the fourth brake B4 of the automatic transmission 22 is engaged or semi-engaged, but a target which is engaged or semi-engaged is not limited to the fourth brake B4. Specifically, any frictional engagement device can be used as long as it can decrease the output shaft rotation speed Nout of the output shaft 42 by engagement thereof. The number of frictional engagement devices which are engaged is not limited to one but may be two or more.

In the above-mentioned embodiment, whether switching of the gear stage has been completed is determined based on whether the position of the sleeve 85 reaches the switching completion position of the gear stage by providing a sensor that detects the position of the sleeve 85, but may be determined based on whether the rotational position of the actuator 92 for moving the sleeve 85 has reached a predetermined switching completion position.

The above-mentioned embodiment is merely an example and the disclosure can be embodied in various aspects such as modifications and improvements based on knowledge of those skilled in the art.

What is claimed is:

1. A control device for a power transmission device, the power transmission device being mounted on a vehicle, the power transmission device including an automatic transmission and a sub transmission,
the automatic transmission including a plurality of frictional engagement devices,
the sub transmission being disposed in a power transmission path between the automatic transmission and driving wheels of the vehicle, the sub transmission being configured to change a rotation speed of an output shaft of the automatic transmission, the sub transmission including a high-speed engagement element and a low-speed engagement element, gear stages of the sub transmission including a high-speed gear stage and a low-speed gear stage,
the high-speed engagement element being configured to be engaged when the high-speed gear stage is established,
the low-speed engagement element being configured to be engaged when the low-speed gear stage is established,
the control device comprising:
an electronic control unit configured to switch the gear stage of the sub transmission,
when the electronic control unit switches the gear stage of the sub transmission, the electronic control unit being configured to control one of the high-speed engagement element and the low-speed engagement element under engagement to be disengaged and configured to control the other one of the high-speed engagement element and the low-speed engagement element to be engaged via a power transmission cutoff state,
the electronic control unit being configured to perform a rotation speed decrease control of decreasing the rotation speed of the output shaft of the automatic transmission,
the electronic control unit being configured to perform the rotation speed decrease control in which at least one frictional engagement device of the plurality of frictional engagement devices is controlled to be one of an engaged state and a semi-engaged state at one of a time point before switching of the gear stage of the sub transmission is started and a time point at which the switching is started,
the electronic control unit being configured to end the rotation speed decrease control during switching of the gear stage of the sub transmission, and
the electronic control unit being configured to switch the sub transmission from the power transmission cutoff state to a state in which one of the high-speed engagement element and the low-speed engagement element that are engaged after the gear stage of the sub transmission is switched is engaged, during disengagement of the at least one frictional engagement device.

2. The control device for a power transmission device according to claim 1, wherein the automatic transmission includes a temperature detector that detects an oil temperature of a hydraulic oil in the automatic transmission, and
the electronic control unit is configured to set a period from a time point at which a command for switching the gear stage of the sub transmission is output to a time point at which the rotation speed decrease control is ended to be longer as the oil temperature of the hydraulic oil detected by the temperature detector becomes higher.

3. The control device for a power transmission device according to claim 2, wherein the electronic control unit is configured to end the rotation speed decrease control when the electronic control unit determines that malfunction has occurred in the temperature detector.

4. The control device for a power transmission device according to claim 2, wherein the electronic control unit is configured to end the rotation speed decrease control at the same time as outputting the command for switching the gear stage of the sub transmission in a range in which the oil temperature of the hydraulic oil is equal to or lower than a preset low temperature threshold value.

5. The control device for a power transmission device according to claim 1, wherein the electronic control unit is configured to engage the frictional engagement devices such that the rotation speed of the output shaft of the automatic transmission decreases.

6. A control method for a vehicle, the vehicle including a power transmission device and an electronic control unit, the power transmission device including an automatic transmission and a sub transmission,
the automatic transmission including a plurality of frictional engagement devices,
the sub transmission being disposed in a power transmission path between the automatic transmission and driving wheels of the vehicle, the sub transmission being configured to change a rotation speed of an output shaft of the automatic transmission, the sub transmission including a high-speed engagement element and a low-speed engagement element, a gear stage of the sub transmission including a high-speed gear stage and a low-speed gear stage,
the high-speed engagement element being configured to be engaged when the high-speed gear stage is established,
the low-speed engagement element being configured to be engaged when the low-speed gear stage is established,
the control method comprising:
switching, by the electronic control unit, the gear stage of the sub transmission;
when the electronic control unit switches the gear stage of the sub transmission, controlling, by the electronic control unit, one of the high-speed engagement element and the low-speed engagement element under engagement to be disengaged, and controlling, by the electronic control unit, the other one of the high-speed engagement element and the low-speed engagement element to be engaged via a power transmission cutoff state;
performing, by the electronic control unit, a rotation speed decrease control of decreasing the rotation speed of the output shaft of the automatic transmission;
performing, by the electronic control unit, the rotation speed decrease control in which at least one frictional engagement device of the plurality of frictional engagement devices is controlled to be one of an engaged state and a semi-engaged state at one of a time point before switching of the gear stage of the sub transmission is started and a time point at which the switching is started;

ending, by the electronic control unit, the rotation speed decrease control during switching of the gear stage of the sub transmission; and switching, by the electronic control unit, the sub transmission from the power transmission cutoff state to a state in which one of the high-speed engagement element and the low-speed engagement element that are engaged after the gear stage of the sub transmission is switched is engaged, during disengagement of the at least one frictional engagement device.

* * * * *